(12) United States Patent
Horelik et al.

(10) Patent No.: US 11,330,096 B2
(45) Date of Patent: May 10, 2022

(54) EMERGENCY DATA STATISTICS AGGREGATION WITH DATA PRIVACY PROTECTION

(71) Applicant: RapidSOS, Inc., New York, NY (US)

(72) Inventors: Nicholas Edward Horelik, New York, NY (US); Ioannis Pazarzis, New York, NY (US); Ryan Dwyer, New York, NY (US); Ofear Balas, New York, NY (US); Gabe Mahoney, New York, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 16/775,977

(22) Filed: Jan. 29, 2020

(65) Prior Publication Data

US 2020/0244797 A1    Jul. 30, 2020

Related U.S. Application Data

(60) Provisional application No. 62/798,642, filed on Jan. 30, 2019.

(51) Int. Cl.
*H04M 3/36* (2006.01)
*H04M 15/00* (2006.01)

(52) U.S. Cl.
CPC ............. *H04M 3/36* (2013.01); *H04M 15/39* (2013.01); *H04M 15/58* (2013.01); *H04M 15/59* (2013.01); *H04M 2242/04* (2013.01)

(58) Field of Classification Search
CPC ........ H04M 3/36; H04M 15/39; H04M 15/58; H04M 15/59; H04M 2242/04
USPC ........... 379/37, 45, 111, 112.01, 112.09, 133
See application file for complete search history.

(56) References Cited

U.S. PATENT DOCUMENTS

| | | | |
|---|---|---|---|
| 9,497,585 B1* | 11/2016 | Cooley | H04W 4/02 |
| 10,631,156 B2* | 4/2020 | Yadav | H04W 4/12 |
| 2014/0087780 A1* | 3/2014 | Abhyanker | G06Q 50/01 |
| | | | 455/521 |
| 2017/0019777 A1* | 1/2017 | Cole, Jr. | H04W 4/90 |
| 2019/0174289 A1* | 6/2019 | Martin | H04W 4/21 |
| 2019/0197059 A1* | 6/2019 | Yu | G10L 15/063 |
| 2020/0288295 A1* | 9/2020 | Martin | H04W 4/022 |

* cited by examiner

*Primary Examiner* — Binh Kien Tieu
(74) *Attorney, Agent, or Firm* — Cygan Law Offices PC; Joseph T. Cygan

(57) ABSTRACT

One disclosed method includes filtering incoming emergency data using at least one filtering criteria, as the emergency data is received in response to initiation of emergency events; generating at least one data bin representing a tally of emergency data meeting the at least one filtering criteria, without storing any of the emergency data used to generate the at least one data bin; and generating a statistical report using the at least one data bin. The statistical report may be generated real-time and displayed on a remote display.

24 Claims, 15 Drawing Sheets

US 11,330,096 B2

EMERGENCY DATA STATISTICS AGGREGATION WITH DATA PRIVACY PROTECTION

The present application claims priority to U.S. Provisional Patent Application No. 62/798,642, filed Jan. 30, 2019, entitled "SECURELY AGGREGATING EMERGENCY DATA FROM MULTIPLE SOURCES" which is assigned to the same assignee as the present application, and which is hereby incorporated by reference herein in its entirety.

FIELD OF THE DISCLOSURE

The present disclosure relates generally enhanced 9-1-1 (E911) and next generation 9-1-1 (NG911) emergency networks, and more particularly, to statistical data related to emergency calls.

BACKGROUND

Mobile communication devices such as smartphones can be used to initiate emergency communications, such as by dialing a designated emergency number like 9-1-1. Certain information, such as the location of the device, can be transmitted to emergency personnel in conjunction with the call. Such information, referred to as emergency data, may include protected data that is subject to various laws, regulations, and policies. For example, health and medical data are types of protected data and the Health Insurance Portability and Accountability Act (HIPPA) governs how health and medical data is handled. In other words, emergency data may include protected data such as health and medical data or other "personally identifiable information" (PII) that is subject to restrictions regarding handling and access. As one example of policy restrictions, emergency data cannot be stored, even in an anonymized way. Thus, emergency data cannot be mined after-the-fact because the emergency data is deleted and no longer accessible.

DETAILED DESCRIPTION

Figure 1:
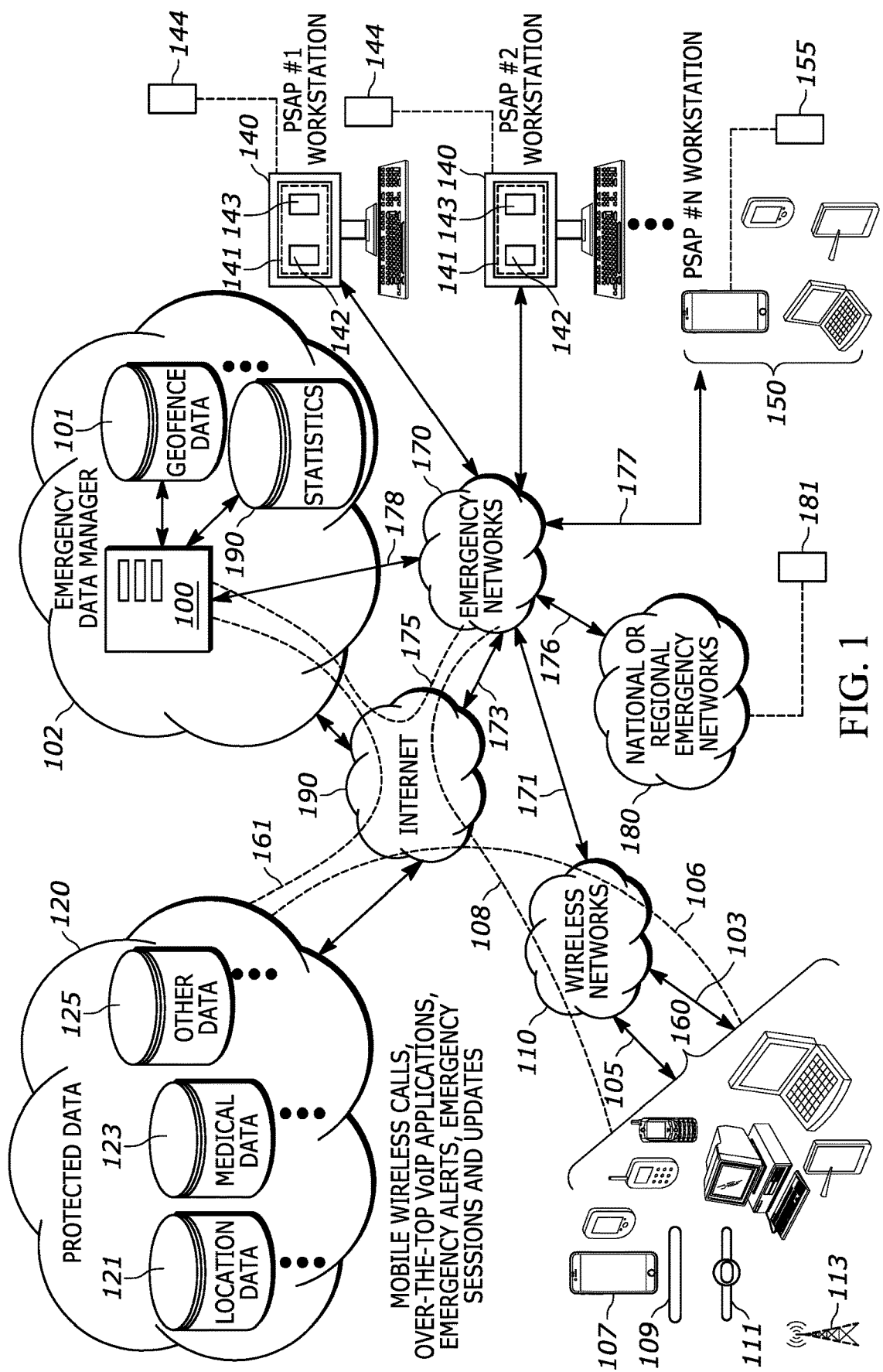
FIG. 1 is a diagram illustrating an emergency data management network in communication with various emergency networks and national or regional emergency networks.

Briefly, the present disclosure provides an emergency data manager and method of operation. The emergency data manager includes a statistics module operative to gather statistical data from multiple emergency networks, and provide real-time views into performance metrics and operational characteristics while maintaining privacy requirements for protected data that cannot be mined after-the-fact due to privacy laws, regulations, or policies regarding data storage and handling. In addition to providing information useful for improving operations of emergency networks, the present disclosure provides a mechanism for monitoring the integrity of data transmission and reception such that security issues may be identified and remedied early, preventing or quickly identifying issues such as but not limited to, mass emergencies, denial-of-service attacks, etc.

One disclosed method includes filtering incoming emergency data using at least one filtering criteria real-time as the emergency data is received in response to initiation of emergency events; generating at least one data bin representing a tally of emergency data meeting the at least one filtering criteria, without storing any of the emergency data used to generate the at least one data bin; and generating a real-time statistical report using the at least one data bin.

The method may further include incrementing the tally in the at least one data bin upon detection of incoming emergency data meeting the at least one filtering criteria; and storing the at least one data bin without storing any of the incoming emergency data used to generate the at least one data bin. Filtering incoming emergency data may include filtering the incoming emergency data using at least one filter selected from the group: time filter, field value filter, field text filter, geofence filter, mesh filter, and access credential filter. The method may perform filtering based on the emergency event using at least one filter selected from the group: emergency calls, emergency alerts, and multimedia data sessions. The method may further include providing a map view to an emergency network entity, where the map view includes the real-time statistical report using the tally in the at least one data bin.

The map view may include a real-time emergency call volume distribution; a real-time cumulative distribution function; a view showing time of delivery of emergency location information to an emergency network entity, versus availability of the emergency location information; a view showing a number of emergency location data payloads versus number of emergency calls; a view showing location uncertainty for a plurality of location determination methods; or some other statistical report, etc.

A disclosed apparatus includes a network component, operative to connect to the Internet; and a processor, operatively coupled to the network component. The processor is operative to: filter incoming emergency data using at least one filtering criteria real-time as the emergency data is received in response to initiation of emergency events; generate at least one data bin representing a tally of emergency data meeting the at least one filtering criteria, without storing any of the emergency data used to generate the at least one data bin; and generate a real-time statistical report using the at least one data bin.

The processor may be further operative to: increment the tally in the at least one data bin upon detection of incoming emergency data meeting the at least one filtering criteria; and store the at least one data bin without storing any of the incoming emergency data used to generate the at least one data bin. The processor may be operative to filter incoming emergency data using at least one filtering criteria real-time as the emergency data is received in response to initiation of emergency events, by filtering the incoming emergency data using at least one filter selected from the group: time filter, field value filter, field text filter, geofence filter, mesh filter, and access credential filter. The processor may be further operative to filter incoming emergency data using at least one filtering criteria real-time as the emergency data is received in response to initiation of emergency events, by filtering based on the emergency event using at least one filter selected from the group: emergency calls, emergency alerts, and multimedia data sessions.

The processor may be further operative to: provide a map view to an emergency network entity, where the map view includes the real-time statistical report using the tally in the at least one data bin. The map view may include a real-time emergency call volume distribution; a real-time cumulative distribution function; a view showing time of delivery of emergency location information to an emergency network entity, versus availability of the emergency location information; a view showing a number of emergency location data payloads versus number of emergency calls; a view showing location uncertainty for a plurality of location determination methods; or some other statistical report, etc.

Turning now to the drawings wherein like numerals represent like components, FIG. 1 illustrates an emergency data manager 100 which is operative to communicate with various multiple Enhanced 9-1-1 (E911) or Next Generation 9-1-1 (NG911) emergency networks 170 via network connections 175. E911 and NG911 emergency networks are defined according to the National Emergency Number Association (NENA) standards which define applicable network architectures and protocols for communication between various network entities within the network architectures. An emergency network may also be referred to as an emergency service provider (ESP) and includes various public and private emergency service providers such as a public safety answering point (PSAP), a public safety services (PSS) as well as private emergency service providers. Put another way, an ESP is an organization that owns and operates an emergency network where the emergency network includes the infrastructure, network entities, communication devices and other equipment required to provide the emergency services. In FIG. 1, double arrowed lines represent operative coupling which may be implemented as backhaul connections between network entities, or as wireless connections between network entities and devices. Curved, dotted lines in FIG. 1 represent network connections or data connections over which data may be sent and received by respective devices, network entities or by combinations of devices and network entities sending data to, and receiving data from, each other, accordingly. The network connections may be Internet connections and may further include Virtual Private Network (VPN) pathways or other secure connections. The emergency data manager 100 is operatively coupled to emergency networks 170 via operative coupling 178, which may be implemented as network connections 175 through the Internet 190. The network connections 175 may include an Internet protocol (IP) connection between each of the emergency networks 170 and the emergency data manager 100 and may be connection oriented or connectionless. For example, the network connections 175 may include IP connections which may include a TCP (Transmission Control Protocol, also referred to as Transport Control Protocol) connection, a UDP (User Datagram Protocol) connection or a combination of both such as UDP over TCP, etc., or a combination of TCP and UDP connections, etc. An IP connection may further employ one or more TCP sockets or one or more WebSocket connections. The emergency networks may have backhaul connections 173 to the Internet 190 and backhaul connections 176 to national or regional emergency networks 180. The emergency data manager 100 may operate as an interface between the emergency networks 170, databases 120 and devices 160, to provide emergency data to the emergency networks 170. The emergency data manager 100 is operative to retrieve various types of emergency data such as location data, medical data, sensor data, camera data and other data, etc., determine the appropriate emergency network 170 authorized to receive specific emergency data, and provide that specific emergency data to the authorized emergency network. The emergency data manager 100 may, under some circumstances and for certain types of emergency data, store obtained emergency data in one or more databases which may be distributed databases. However, emergency data that includes protected data is not stored, or that may only be stored for a limited period of time. Protected data is data that is subject to laws, regulations or policies that define how the data is accessed and handled.

The emergency data manager 100 may communicate with, and retrieve and obtain data from, the various databases 120, and may also receive and store emergency data from the devices 160. The emergency data manager 100 is operative to determine the authorized emergency network using a geofence database 101 which includes boundary information for all of the emergency networks 170 and also for national or regional emergency networks 180. The emergency data manager 100 is also operative to generate statistics that are stored in statistics database 190 which is operatively coupled to the emergency data manager 100.

The various emergency networks 170 may include various public safety answering points (PSAPs). Each emergency network such as, but not limited to a PSAP, may include an emergency dispatch center and employ a computer aided dispatch (CAD) system. Each emergency network 170 includes various network entities such as at least one workstation 140, which may be a CAD system, a call handling system or some other type of workstation, and which provides various graphical user interfaces (GUIs) on a display 141 for use by emergency network personnel. The term "emergency network entity" refers to a hardware apparatus used to access or implement an emergency network such as, but not limited to, workstations, servers, routers, switches, laptops, desktop computers, etc. An emergency network entity hardware apparatus may include software or firmware related to its emergency network function.

Each individual emergency network 170 may include an emergency call handling system which is operatively coupled to a PSTN (public switched telephone network) and various wireless networks 110 via appropriate backhaul connections 171. The various emergency networks 170 are each operative to receive emergency calls 103 from a variety of devices 160 and a variety of device types. Each individual emergency network 170 may also receive emergency alerts 105 and establish emergency sessions 108 from the various devices 160 over the Internet 190. An emergency alert 105 may be sent as, for example, short message service (SMS) messages, SMS data messages, instant messages (IM), multi-media messages (MMS), email, or other formats of messages sent as Internet Protocol (IP) messages. For example, IP based messages may be sent using TCP, UDP, SIP, HTTP, or other mechanisms, etc. Emergency sessions 108 may also be established using these same, or other, IP protocols. An emergency session 108 refers to communication over an Internet connection between any the various types of devices 160 and an emergency network, where there is bi-directional communication between one of the devices 160 and a particular emergency network of the emergency networks 170. One example of an emergency session 108 is a Voice-over-IP (VoIP) call using Session Initiation Protocol (SIP). Another example is an IP call using H.323 protocol, or some other communication protocol, etc. An emergency alert 105 may be, but is not limited to, data sent from a device 160 to a given one of the emergency networks 170. Because the emergency alert 105 will contain information that identifies the specific device 160 that sent the alert, the specific emergency network that received the emergency alert 105 may be able to respond to the device 160 by sending a response or acknowledgement message, or by making a call-back if the device 160 is for example, a mobile telephone such as a smartphone 107. The information that identifies a specific device 160 is referred to herein as a "device identifier." That is, a "device identifier" refers to information allowing identification of the device or a user of the device, such as for example, a phone number associated with a user, an email address, physical address, coordinates, IMEI number, IMSI, TMSI, IP address, BSSID, SSID or MAC address.

The various types of devices 160 that may communicate with an emergency network include, but are not limited to, desktop computers, laptop computers, tablets, mobile phones, smartphones 107, smartwatches 111 (or other health and medical tracking devices), medical bracelets 109, and various wired devices which may be Internet-of-Things (IoT) devices 113 which are operative to send and receive data from a wireless network such as, but not limited to, a $5^{th}$ generation mobile network (5G network). A medical bracelet 109 may be a type of IoT device and may be operative to transmit an emergency alert 105 to an emergency network. Emergency calls may also be made from landline phones connected to a PSTN and medical bracelet 109 and/or health monitoring device, such as a medical bracelet 109, may use a wireless access point connected to the PSTN to place an emergency call 103 or send emergency alert 105.

An "emergency alert" refers to a communication relating to an emergency or non-emergency situation. That is, an emergency alert may be an emergency request for assistance where the emergency alert is associated with an emergency situation. An emergency alert may include information related to a device, the device user, past and current location, or an indication of the type of emergency such as, but not limited to, police, fire, medical, CO level, traffic accident or some other information in various combinations. An emergency alert may be associated with a non-emergency situation such as a request for a tow truck after a car breaks down. In other words, a situation that requires assistance, but is not necessarily a life-or-death critical situation. Emergency alert may be associated with a device that sent the alert, or may be associated with a device not sending the alert such as a device making a proxy request on behalf of a second device or a member device in a group of devices, etc. An emergency alert may be "associated" with a device or user when the emergency alert relates to an emergency or non-emergency situation involving the device or user. Emergency alerts may include pointers to other sources of information such as, but not limited to, medical records and health data for the device user, or for another device user in a proxy situation, etc.

Each of the devices 160 may also be operative to send data updates 106 to various databases 120 and this data may subsequently be used as information included in emergency alerts 105. The databases 120 may contain protected data in that the data is subject to various statutorily defined protections, such as, but not limited to, HIPPA, GDPR, or other statutorily defined data protection and data privacy requirements. The databases 120 may include location databases 121, medical databases 123 and other databases 125 with various personally identifiable data related to device 160 users. The data contained in the databases 120 is referred to as "emergency data" and may be retrieved by the emergency data manager 100 via an IP connection 161.

In each emergency network 170, at least one workstation 140 includes one or more processors that are operative to execute one or more emergency services related applications such as an emergency response application 144. The workstation 140 includes a display 141 operative to display one or more graphical user interfaces (GUIs), such as GUI 142 and GUI 143, which are related to, and provided by, the emergency response application 144. The emergency response application 144 is operative to communicate with the emergency data manager 100. The emergency data manager 100 is included within an emergency data management network 102 which may include one or more servers, and one or more databases such as geofence database 101 and statistics database 190. The emergency data manager 100 may be implemented as a server having at least one processor, or may be implemented as a distributed system with multiple servers, processors, memory and databases, and may further provide cloud-based, software-as-a-service (SaaS) features and functions. The GUI 142 and GUI 143, in conjunction with the emergency response application 144, are operative to retrieve and display emergency data provided by the emergency data manager 100. The GUI 142 and GUI 143 provide communication between the workstation 140 and the emergency data manager 100. The GUIs may each be provided as a web browser interface, such as a cloud-based application interface (i.e. a software-as-a-service SaaS interface), or via a web browser plug-in, or may be associated with applications running as executable instructions, executed by one or more processors on the machine/workstation on which the GUIs are displayed, or by any other software implementation mechanism.

Emergency services personnel may receive appropriate emergency services information and view emergency data via the GUI 142, GUI 143 and other GUIs, and place dispatch calls to emergency responders who receive the dispatch calls and emergency data on various emergency responder devices 150 accordingly. Emergency responders, also referred to as emergency service providers (ESPs) may utilize a variety of emergency responder devices 150 which may include, but are not limited to, desktop computers, laptop computers, tablets, mobile phones, smartphones, radios (i.e. walkie-talkies), in-vehicle computers, etc., all of which are operative to display emergency data to the emergency responders. The devices 150 may be operative to send emergency data requests to a respective emergency network 170 and also authentication data. The devices 150 communicate with the emergency networks 170 over a combination of wireless networks 110 and proprietary wireless networks that provide wireless communications links 177. Each of the devices 150 may include a mobile emergency response application, that provides a GUI 155 and that is operative to communicate with the emergency response application 144 and the emergency data manager 100.

An emergency data request from an ESP device 150, may be sent by an appropriate one of the emergency networks 170 to the emergency data manager 100 such that the emergency data manager 100 may identify the emergency and any emergency data pertaining to the emergency stored by the emergency data manager 100 or contained within the various databases 120, and transmits the pertinent emergency data to the requesting ESP device 150. In other words, in some implementations, the emergency data manager 100 may serve as a data pipeline for ESP devices 150 through which the ESP devices 150 may request and retrieve reliable emergency data through secure pathways using defined protocols and formats. The emergency data may be, but is not limited to, accurate location data, that is critical for responding to an emergency. The emergency data manager 100 is operative to obtain emergency data from various sources including other servers, databases and devices 160.

In one example of operation, an emergency alert 105 may be triggered by a device 160 in any of various ways such as, but not limited to, device fall detection, by the user pressing a soft button or a physical button (i.e. a "panic button"), a voice command, a gesture, or autonomously based on other sensor data such as via a smoke, carbon-monoxide, burglar alarm, or some other alarm, etc. In some situations, the user may confirm the emergency or provide authorization for sending the emergency alert 105.

Emergency data, such as enhanced location data, medical data, or other data, may be sent by device 160 to an appropriate one of the emergency networks 170 as part of the emergency alert 105, or may be sent as data updates 106 to a specific database of the various databases 120. The emergency data manager 100 may interact with the given emergency network to access and obtain the emergency data, or the emergency network may send an emergency data request to the emergency data manager 100 such that the emergency data manager 100 may search or query the various databases 120 in response to receiving an emergency alert 105. In some implementations, an emergency data request may be sent by the emergency data manager 100, over the IP connections 161, to the various databases 120 in response to an emergency alert 105 received by an emergency network.

The emergency data manager 100 or the emergency network may format stored emergency data or any received emergency data into a format that is compatible with industry standards for storing and sharing emergency data. For example, the emergency data may be formatted to be compatible with National Emergency Number Association (NENA) standards. Where emergency data is stored by the emergency data manager 100, emergency data requests may be sent to the emergency data manager 100 by an emergency network, such as via an HTTP GET request. Therefore, emergency data requests may be sent from any one of the emergency networks 170 to the emergency data manager 100. The emergency data requests may utilize Location Information Server (LIS) protocol. For emergency data related to location, the data may include, but is not limited to, device generated location data (such as device 160 GPS chipset data), location information such as Location-by-Reference, Location-by-Value, etc. from, for example a, Location Information Server (LIS) or from other sources.

Each of the emergency networks 170 may be operatively coupled, via appropriate backhaul connections 176, to one or more national or regional emergency networks 180. The national or regional networks 180 each include an emergency event application 181 which is operative to, among other things, display emergency events for a hierarchical view of emergencies being handled by one or more of the emergency networks 170.

Figure 2:
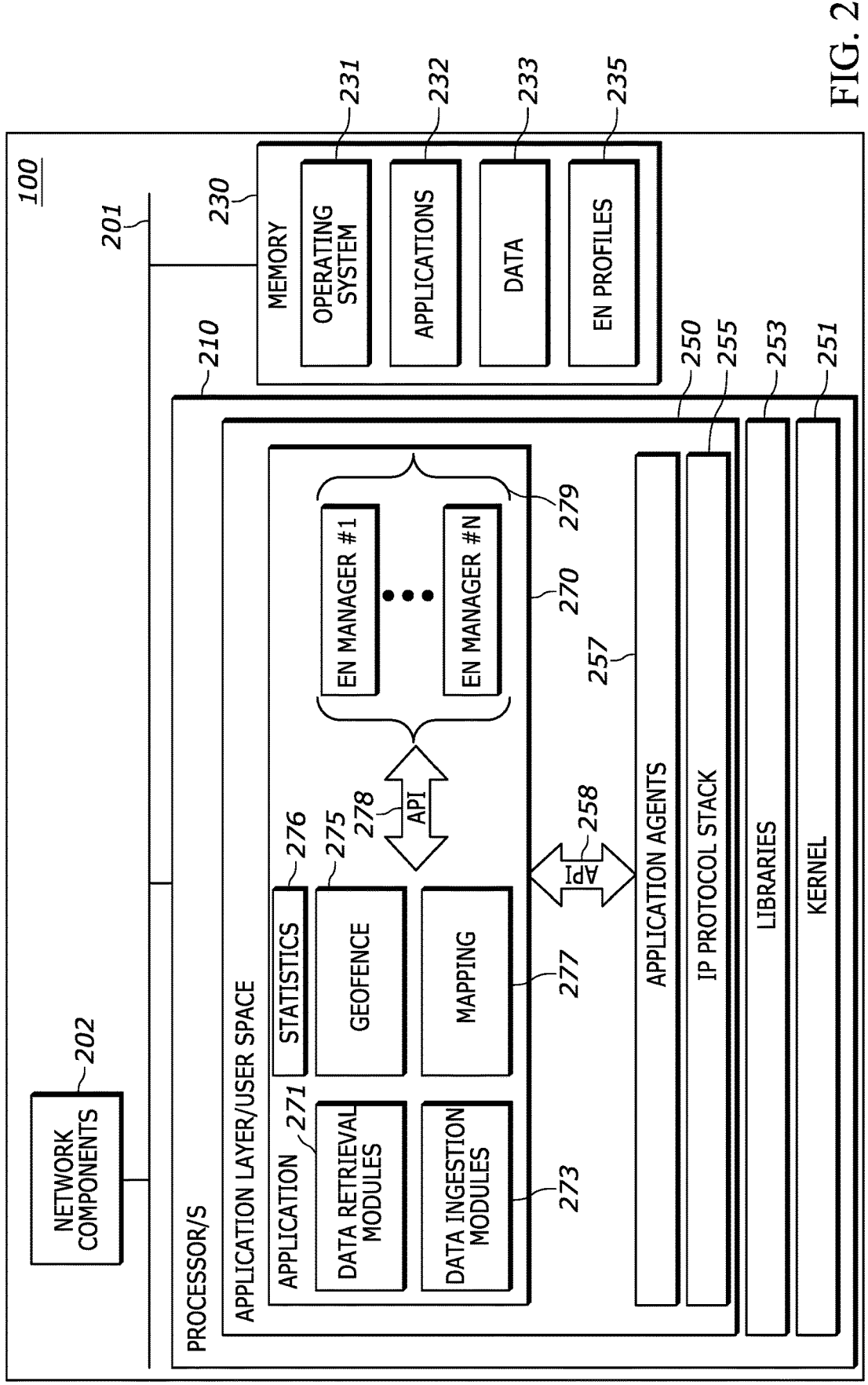
FIG. 2 is a diagram illustrating an emergency data manager having a statistics module in accordance with various embodiments.

FIG. 2 provides an example implementation of the emergency data manager 100 which is an apparatus shown in FIG. 1. The emergency data manager 100 includes network components 202, at least one processor 210, and at least one non-volatile, non-transitory memory 230 in addition to RAM. The at least one processor 210 is an emergency data management processor and is another type of apparatus shown in FIG. 1. The network components 202 may include one or more network transceivers for Ethernet connectivity to other network entities and an Internet connection. The memory 230 stores executable instructions and data such as executable instructions for an operating system 231 and various applications 232. The memory 230 also stores data 233 which may provide a location and geofence data cache and other data. The executable instructions may be executed by the at least one processor 210.

The processor 210 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 210 is configured and operative to fetch and execute computer-readable instructions (i.e. executable instructions) stored in the memory 230. For example, the operating system 231 executable instructions, when executed by the at least one processor 210, may provide a kernel 251, libraries 253 (i.e. application programming interfaces or "APIs"), an application layer 250 or "user space" within which the various applications are executed, and an IP protocol stack 255. The applications 232 executable instructions, when executed by the at least one processor 210, also provide data retrieval modules 271, data ingestion modules 273, a geofence module 275, a mapping module 277, a statistics module 276 and one or more emergency network managers 279. Emergency network profiles 235, stored in memory 230, may be accessed by the various modules and the emergency network managers 279 to access information needed to communicate with various emergency networks. The emergency network managers 279 communicate with the other modules of application 270 via a set of APIs 278. The processor 210 may further execute a set of application agents 257 which facilitate communication between the IP protocol stack 255 and the application 270 via various APIs 258. The application agents 257 are operative to, among other things, provide API communication between the various applications 232 and the kernel 251.

The emergency data manager 100 may be implemented as a cloud server. The term "cloud server" as used herein, refers to a server, accessible by an Internet connection, that is operative to host one or more applications that may be accessed by a computing device using a Web browser or an application resident on the computing device. The emergency data manager 100 is operative to provide a cloud-based application such as a software-as-a-service (SaaS) accessible remotely using a computer or workstation connected to the Internet and operatively coupled to the emergency data manager 100.

All of the components of the emergency data manager 100 are operatively coupled by an internal communication bus 201. As used herein, components may be "operatively coupled" when information can be sent between two such components, even though there may be one or more intermediate or intervening components between, or along the connection path. Therefore, any of the various components with the emergency data manager 100, and in other example network entities and devices described herein, may be understood herein to be operatively coupled to each other where appropriate, and to be executing on one or more processors that are further operatively coupled to a memory that stores executable instructions (also referred to as "software code" or "code") for implementing the various components. Operative coupling may also exist between engines, system interfaces or components implemented as software or firmware executing on a processor and such "software coupling" may be implemented using libraries (i.e. application programming interfaces (APIs)) or other software interfacing techniques as appropriate. Such libraries or APIs provide operative coupling between various software implemented components of FIG. 2. A "module" as used herein may be a software component. That is, the data retrieval modules 271, data ingestion modules 273, a geofence module 275, a mapping module 277, a statistics module 276 and one or more emergency network managers 279 are all operatively coupled to each other via APIs 278 and are operatively coupled to the IP protocol stack 255 and to the application agents 257 via APIs 258.

All of the components and modules described herein may be implemented as software or firmware (or as a combination of software and firmware) executing on one or more processors, and may also include, or may be implemented independently, using hardware such as, but not limited to, ASICs (application specific integrated circuits), DSPs (digital signal processors), FPGAs (field programmable gate arrays), hardwired circuitry (logic circuitry), or combinations thereof. That is, any of the components or modules disclosed herein may be implemented using an ASIC, DSP, FPGA, Arduinos, executable instructions executing on a processor, logic circuitry, or combinations thereof. In other words, the components and modules may be implemented as hardware, software or by combinations thereof. Therefore, each of the components and modules disclosed herein may be considered a type of apparatus that may be implemented and operate independently from the other components in the system. For example, any one of the data retrieval modules 271, data ingestion modules 273, geofence module 275, mapping module 277, statistics module 276 or emergency network managers 279 may be implemented using an ASIC, DSP, FPGA, executable instructions executing on a processor, logic circuitry, or combinations thereof.

The various embodiments also include computer readable memory that may contain executable instructions, for execution by at least one processor, that when executed, cause the at least one processor to operate in accordance with the emergency data manager 100 and other functionality herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices or electronic devices such as those that may benefit from the features and methods of operation herein described. The executable instructions may also include the various operating system environments and the kernel. For example, the memory 230, which is a non-volatile, non-transitory memory, may store executable instructions for execution by the at least one processor 210 that when executed, provide the data retrieval modules 271, data ingestion modules 273, geofence module 275, mapping module 277, statistics module 276 or emergency network managers 279.

The emergency data manager 100 is operatively coupled to a geofence database 101 which stores jurisdictional boundary data for various emergency networks 170 as well as for the national or regional emergency networks 180. The emergency data manager 100 is operative to store and retrieve emergency data from the various databases 120, and may function as an interface between emergency networks, the various databases 120 and devices 160 to receive and store emergency data. The stored emergency data can be transmitted or distributed to emergency networks and emergency responder devices 150 before, during, or after emergencies. The emergency data manager 100 is operatively coupled to a statistics database 190 which stores statistics related to emergency data that includes protected data which is not stored by the emergency data manger 100 or that is stored only for a predetermined period of time as defined by laws, regulations or policies. The emergency data manager 100 may receive emergency data from any of the devices 160 and such data may include, but is not limited to, locations, medical history, personal information, or contact information.

The emergency data manager 100 includes data ingestion modules 273 and data retrieval modules 271. The data ingestion modules 273 are operative to communicate with the various databases 120 to obtain emergency data and may include a location ingestion module, an additional data ingestion module, and one or more multimedia ingestion modules. The location ingestion module is an emergency location service ingestion interface which is operative to post or receive emergency locations. The location ingestion module may be a REST API that is operative to receive an HTTP POST including location data when an emergency alert 105 is generated or when an emergency call 103 is received from a device 160. The location data may include a location generated concurrently or in response to the generation of the emergency alert 105, which may initiate an emergency call 103 or emergency session for requesting emergency assistance. This generated location data may be, for example, location data from a device 160 GPS chipset, such as GPS coordinates. This data may also include data from a device 160 inertial-measurement-unit (IMU). The location data may be generated before an emergency alert 105 such as, for example, when a medical bracelet IMU detects that a patient has fallen. In another example, when an emergency call 103 is made from a device 160, the location ingestion module of the data ingestion modules 273 may receive a location recently generated by the device 160 GPS chipset, or by a device 160 triangulation algorithm, or other device 160 location mechanism, thereby ensuring that a location for the emergency is available as quickly as possible. The location data may include a device-based hybrid location generated by a device 160 which has sent an emergency alert 105. A GPS chipset within the device 160 may generate the location data. The location data may also include a location data generated by a second device 160 that is communicatively coupled to the device 160 that sent the emergency alert 105. For example, a wearable device such as a medical bracelet or smartwatch, that does not include location capabilities, may use the location services location from a mobile phone with which it is paired. The location ingestion module of the data ingestion modules 273 may communicate with a device 160 via a mobile application installed on the device 160 or via firmware or an operating system of the device 160.

The location data generated by a device 160 prior to an emergency occurrence may be accessible by an authorized one (based on device 160 location) of the emergency networks 170 during an emergency. For example, a taxi company may have software that transmits the location of its cars or assets to the emergency data manager 100, or another server, preemptively. Thus, when an emergency arises, the location of the affected taxi can be made accessible quickly to send for help. Further, location data generated by a device 160 after an emergency has commenced may be made accessible to one of the emergency networks 170 during the on-going emergency. For example, updated location data of a hijacked taxi may be periodically transmitted to the emergency data manager 100 and made accessible to one or more of the emergency networks 170.

The data ingestion modules 273 may also provide an interface for posting or receiving static or dynamic emergency profile data. Such additional data may include, but is not limited to, medical data, personal data, demographic data, and health data, which may be obtained from the various databases 120. For example, medical data may include information relating to a person's medical history, such as medications the person is currently taking, past surgeries or preexisting conditions. Personal data may include a person's name, date of birth, height, weight, occupation, addresses such as home address and work address, spoken languages, etc. Demographic data may include a person's gender, ethnicity, age, etc. Health data may include information such as a person's blood type or biometrics such as heart rate, blood pressure or temperature. Additional data may further include data received from connected devices such as vehicles, IoT devices 113, and wearable devices such as medical bracelet 109, smartwatch 111 or other devices, etc. For example, intelligent vehicle systems may generate and send data regarding a crash, such as the speed at which the vehicle was moving just before the collision, where the vehicle was struck, the number of occupants, etc. The data ingestion modules 273 may be implemented in whole or in part using a REST API, for example using JSON (JavaScript Object Notation).

In one example of operation, if an emergency call 103 is made from a mobile phone, or if an emergency alert 105 is sent, the mobile phone may receive a heart rate of the person who made the emergency call from a smartwatch 111 worn by the person and communicatively coupled to the cell phone via a or Bluetooth™ connection or some other wireless connection. The mobile phone may therefore send the heart rate to the data ingestion modules 273, along with any other additional data, in an HTTP POST. The data ingestion modules 273 may communicate with a device 160 via a mobile application installed on the device 160 or integrated into the firmware or operating system of the device 160. Additional data may also be sent to the data ingestion modules 273 from a network server. The data ingestion modules 273 may be accessed by any connected platform that receives data that might be relevant in an emergency. Connected platforms, such as the various databases 120, may therefore send additional data to the data ingestion modules 273 at any time. A website, web application, or mobile application may communicate with the data ingestion modules 273 and may allow device 160 users to create profiles to send additional data included in the profiles to the data ingestion modules 273 every time a profile is created or updated.

The data ingestion modules 273 may also include a multimedia ingestion module to provide an interface for posting or receiving data such as audio or video streams obtained during an emergency from a device 160 that is proximal to the emergency. In one example of operation, if an emergency alert 105 is generated by an intelligent vehicle system installed in a vehicle in response to the vehicle experiencing a collision, the emergency alert 105 is sent to one of the emergency networks 170 by the intelligent vehicle system or by another device 160 communicatively coupled to the intelligent vehicle system, such as a mobile phone coupled to the intelligent vehicle system via Bluetooth™. In response to generating the emergency alert 105, the intelligent vehicle system may additionally begin streaming audio and video from microphones and cameras installed inside or outside of the vehicle to the emergency data manager 100 through the data ingestion modules 273. A mobile phone communicatively coupled to the intelligent vehicle system may additionally or alternatively stream audio or video from microphones and cameras integrated into the mobile phone to the emergency data manager 100 through the data ingestion modules 273. One or more multimedia ingestion modules of the data ingestion modules 273 may be implemented wholly or partly using REST APIs that are accessed with an HTTP POST.

After receiving the relevant data, the data ingestion modules 273 can store the data in one or more databases operatively coupled to the emergency data manager 100. The emergency data manager 100 may be operatively coupled to databases such as, but not limited to, a location database, the geofence database 101, statistics database 190, etc. The emergency data manager 100 databases may also be operatively coupled to, or otherwise accessible by, one of the emergency networks 170. The data ingestion modules 273 are operative to tag or otherwise associate received data with an identifier of a user or specific device 160 associated with the data. For example, the data ingestion modules 273 may tag received data with a user ID number, an email address, or a phone number (i.e. caller ID), a MAC address, or other device or user identification information, etc. The data ingestion modules 273 may also tag received data based on the data source using, for example, a device name or type, an application name, user name, phone number, corporate account, or etc.

An individual or group of individuals may be associated with multiple identifiers. In an example of operation, if the data ingestion modules 273 receive a location generated by a phone associated with the phone number +1-555-555-5555, associated with John Doe, the data ingestion modules 273 may also receive a heart rate from a smartwatch associated with the email address jobndoe@email.com, which is an identifier that is also associated with John Doe. In this example, the data ingestion modules 273 tag the location with the phone number "+1-555-555-5555," and tag the heart rate with the email address "johndoe@email.com,"

thereby associating both the location and the heart rate with John Doe in the emergency data manager 100 databases.

Ingestion data that enters the emergency data manager 100 may include various data fields and associated data entries within the data fields. The emergency data manager 100 maintains a list of expected data fields so that the data entries can be entered within a specific data field.

The emergency data manager 100 may include data retrieval modules 271. The data retrieval modules 271 may include a location retrieval module, an additional data retrieval module, and one or more multimedia retrieval modules. For example, a location retrieval module may provide an interface for retrieving location data from the emergency data manager 100 databases. The location retrieval module may be implemented wholly or partly via a JSON REST API that is operative to receive a query or request such as, but not limited to, an HTTP GET request, from the emergency networks 170 or an ESP device 150.

The data retrieval modules 271 may provide a single GET endpoint for retrieving either the latest or paginated list of locations for a specific caller ID. For example, a phone number associated with a device 160 from which a location was received may be included in a header, body, or metadata of a request sent to the data retrieval modules 271. The emergency data manager 100 may then retrieve a location or set of locations from the emergency data manager 100 databases and deliver the location or set of locations to the relevant authorize emergency network 170 or to an ESP device 150 associated with the authorized emergency network. The location retrieval module of the data retrieval modules 271 may be a location information server (LIS), in which the LIS may further be a NG911 standards-based XML API for the retrieval of location data from the emergency data manager 100 databases. The location retrieval module of the data retrieval modules 271 may be operative to accept HELD requests from the emergency networks 170 or from ESP devices 150 and to return location data for a specific caller ID or anonymous reference.

The data retrieval modules 271 may also include an additional data retrieval module implemented as a JSON REST API for the retrieval of emergency or additional data. Additional data may include, but is not limited to, medical data, personal data, demographic data, health data or other data which may be protected data. Additional data may also include data received from connected devices 160 such as, but not limited to, vehicles, IoT devices, and wearable devices. The additional data retrieval module of the data retrieval modules 271 may be operative to receive a query or request, such as an HTTP GET request, from an emergency network 170 or ESP device 150. The additional data retrieval module of the data retrieval modules 271 may then, in response to a request, retrieve additional data associated with a specific or particular identifier of a user or a device 160 associated with the user, such as a phone number, and return the data to the emergency network 170 or ESP device 150. The data retrieval modules 271 may further include one or more multimedia retrieval modules, which function similarly to the location retrieval module and additional data retrieval module, for the retrieval of data stored in the emergency data manager 100 databases not retrieved by the location retrieval module or additional data retrieval module such as multimedia streaming data.

The emergency data manager 100 determines which of the emergency networks 170 and associated ESP devices 150 have authorization to receive particular types of emergency data. For example, a given emergency network or ESP device 150 may, in certain circumstances, be granted access only to a particular subset of emergency data. For example, a police officer may only be given access to the location emergency data, while an EMT (emergency medical technician) may only be given access to an additional data emergency data. However, a given emergency network such as a national or regional emergency network 180, or associated ESP device 150, may be given differential access to the entirety of the emergency data, or to particular emergency data categories within the databases based on any factor or set of factors. A management portal may be provided to determine which emergency data categories are returned from one of the emergency networks 170 to a particular emergency network or ESP device 150. Other data services corresponding to the various databases 120 may also be coordinated with respect to granting access to protected data.

During an emergency, the emergency data manager 100 is operative to detect the emergency and/or otherwise identify the need to provide emergency data pertaining to the emergency. In response to detecting an emergency, the emergency data manager 100 is operative to identify any emergency data pertaining to the emergency stored within the databases 120, retrieve and transmit the pertinent emergency data to the appropriate emergency network 170. The emergency data manager 100 may act as a data pipeline that automatically pushes emergency data to emergency networks that would otherwise be without access to emergency data that is critical to most effectively and efficiently respond to an emergency. Location data stored within, and/or obtained and provided by, the emergency data manager 100, enables emergency responders to arrive at the scene of an emergency faster, and the additional emergency data stored within, and/or obtained and provided by, the emergency data manager 100 enables emergency responders to be better prepared for the emergencies they face.

The emergency data manager 100 is operative to provide a cloud-based application to multiple emergency networks 170 by establishing network connections via the IP protocol stack 255, with various emergency network entities such as a call handling workstation, CAD workstation etc. Other examples of emergency network entities include, but are not limited to, servers, desktop computers, laptops, routers, switches, etc. that are operative to send and receive data. The network connections may be transport control protocol (TCP) connections and may utilize WebSocket connections between the emergency data manager 100 and an emergency network entity. The geofence module 275 is operative to determine emergency network jurisdictional boundaries and to show the jurisdictional boundaries on a graphical user interface as a jurisdictional map view. The mapping module 277 is operative to generate the jurisdictional map view and to also post emergency data locations as location indicators on the map. For example, location indicators may show the location of incoming emergency calls that the emergency network has received, or is receiving. The emergency network managers 279 provide authentication and login capabilities for the various emergency networks and enable APIs 278 for communication between the emergency network entities and the data ingestion modules 273, data retrieval modules 271, geofence module 275, mapping module 277 and statistics module 276.

Emergency networks and their corresponding emergency network entities are associated with a given geographic boundary. Based on the geographic boundary for a respective emergency network, a jurisdictional map view customized for the respective emergency network may be generated and provided to emergency network entities such as workstations for display. Within the jurisdictional map view for the emergency network, location indicators for emergencies occurring within its geographic boundary may be displayed. The jurisdictional map view for a given emergency network may include one or more geofences associated with the respective emergency network and surrounding areas.

In an example of emergency data manager 100 operation, an emergency alert may be triggered by a given device 160, for example by a user pressing a soft button, a physical button, initiating a voice command, or gesture, or autonomously based on sensor data such as from a smoke alarm. In this example, the user may be prompted to confirm the emergency or otherwise provide authorization for sending the emergency alert. Emergency data, such as an enhanced location and additional data regarding the user, such as the user's medical history, may then be delivered by the device 160 to the emergency data manager 100 and stored in a database. The emergency data manager 100 may format the emergency data into a format that is compatible with industry standards for storing and sharing emergency data. For example, the emergency data may be formatted to be compatible with National Emergency Number Association (NENA) standards. The emergency data manager 100 performs a push operation to push the emergency data to an emergency network entity. After the push operation, the emergency data manager 100 may delete any temporarily stored data if required for compliance with privacy laws, regulations and policies.

Emergency data may also be obtained by the emergency networks 170, such as by a PSAP responding to an emergency alert, by sending a query to the emergency data manager 100. The query may be an emergency data request using, for example, an HTTP GET request. The emergency data request may also be in the form required by the Location Information Server (LIS) protocol. In response to the emergency data request, the emergency data manager 100 sends an appropriate response including relevant emergency data to the requesting party via an encrypted pathway. The emergency data request may be in the form of an HTTP-Enabled Location Delivery (HELD) and the response from the emergency data manager 100 may be in the form of a Presence Information Data Format Location Object (PIDF-LO) as defined by the Internet Engineering Task Force (IETF).

The emergency data request includes an authorization code, also referred to as an "authorization token", in the body, header, or metadata of the request, and the emergency data manager 100 checks that the authorization code is active before providing a response to the requesting party. Authorization may be provided in the "Authorization" header of the emergency data request using HTTP Basic Authentication. For example, authorization may be a base64-encoded user name and password for an account associated with the requesting party. Emergency data requests are sent over public networks using API access keys or credentials. Transport Layer Security (TLS) may be used in the requests and responses from the emergency data manager 100 for encryption security. In some implementations, the API access keys or credentials are sent using Extensible Markup Language (XML) in a message header and may be further encrypted for additional security. If an emergency data request includes an inactive or expired credential or access key, an error response may be generated and sent to the requesting entity by the emergency data manager 100.

The statistics module 276 is operative to monitor for emergency data requests from the various emergency networks 170 and also emergency data being pushed to the emergency networks 170. The statistics module 276 filters data points derived from the emergency data and created bins representing tallies of event occurrences such the bins may be used in statistics reporting functions. For example, various statistical data presentations may be made such as, but not limited to, histograms, heat maps, density plots, etc. The statistics are related to streams of emergency data that cannot be stored, even in an anonymized way, because of privacy considerations. In other words, the emergency data cannot be mined or analyzed using stored data because of privacy laws, regulations or policies that define how the data is accessed and stored. The statistics module 276 is therefore operative to generate and report metrics in real-time as the data flows from one point to another for use in emergency responses. Events are emergency events that include, but are not limited to, emergency sessions such as emergency calls 103, emergency alerts 105, emergency data sessions (including multimedia data sessions), etc. that may have associated emergency data that may be obtained from various sources such as devices 160, databases 120, or other sources. The reports may be generated in "real-time" in that the reports may be displayed on a GUI as emergency data is obtained by the emergency data manager 100 and sent to emergency networks. The GUI may be displayed on a computer display located remotely from the emergency network to which the emergency data is sent by the emergency data manager 100. This display may be located as at supervisory authority such as at one of the national or regional emergency networks 180. In other words, the statistics module 276 is operative to provide a view into operations and performance of the emergency data manager 100 and also the status of emergencies occurring within geofence boundaries of emergency networks being served by the emergency data manager 100. Put another way, the statistics module 276 is operative to provide real-time views of statistical data as emergencies are occurring and being handled. It is to be understood that the "real-time" views may be subject to network latency such as IP packet delay that may occur on Internet connections from time-to-time. Therefore, the term "real-time" as used herein refers to providing reports as emergency data is obtained by the emergency data manager 100 and sent to emergency networks, notwithstanding any time delay that may occur due to data transport mechanisms, processing delay or both. For example, latencies as long as fifteen minutes, subsequent to when emergency data is obtained, would still be considered "real-time" in accordance with the term usage herein.

In some instances, emergency data with personal identifiable information (PII) is saved temporarily in memory or deleted. The statistics module 276 is operative to generate aggregated statistics for analysis and reporting without storing or accessing any PII related to the emergency data. The statistics data may be stored because it will not contain PII.

Figure 3:
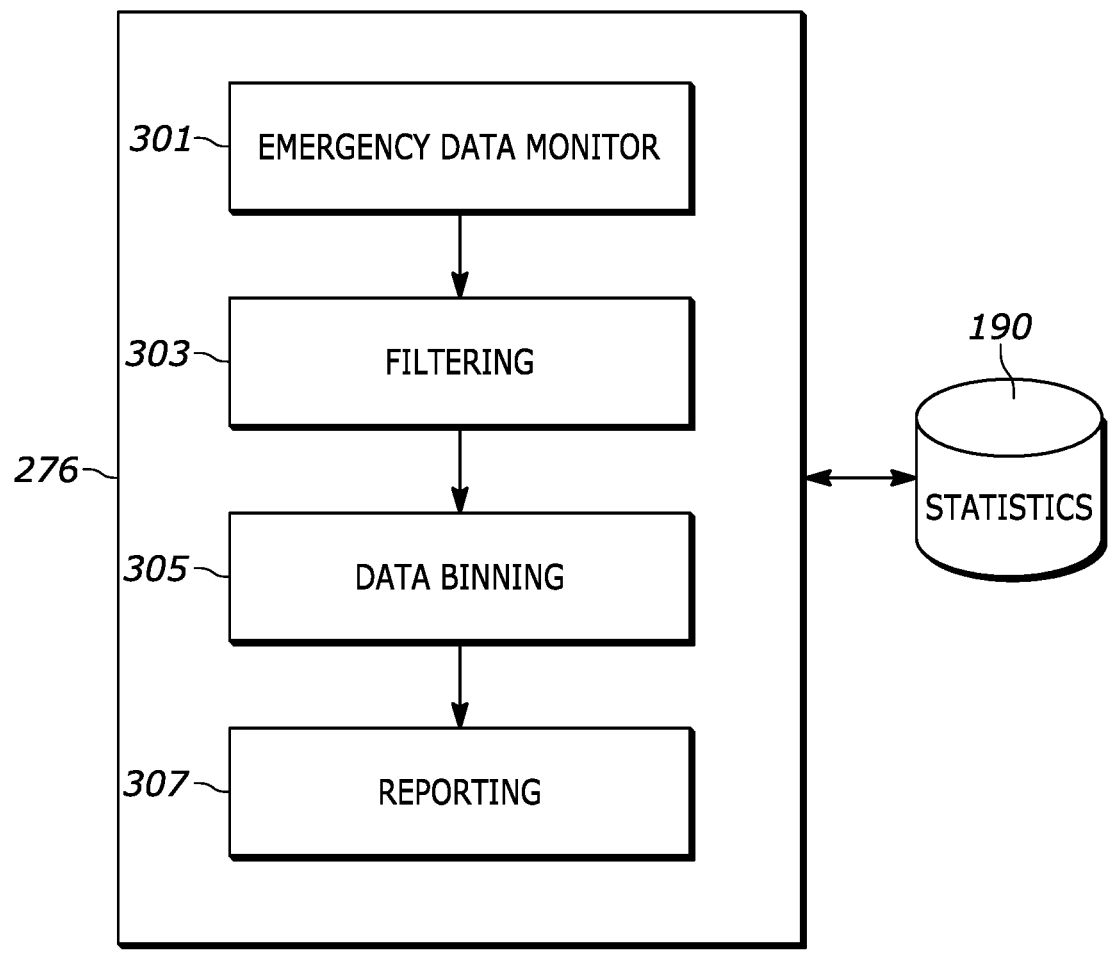
FIG. 3 is a diagram providing further details of a statistics module in accordance with one embodiment.

FIG. 3 provides further details of the statistics module 276 in accordance with one embodiment. The statistics module 276 includes an emergency data monitor 301, a filtering module 303, a data binning module 305 and a reporting module 307. The statistics module 276 is operatively coupled to a statistics database 190 in which generated statistics data is stored for subsequent report generation by the reporting module 307. The emergency data monitor 301 detects the emergency data requests from the various emergency networks 170 and also emergency data being pushed from the emergency data manager 100 to the emergency networks 170, and generates input notifications associated with either the emergency data requests or emergency data payloads. The emergency data monitor 301 then provides the notifications as input messages to the filtering module 303.

The filtering module 303 is operative to filter emergency data using various criteria such as, but not limited to, an associated geofence, an access key defining which emergency network are authorized to receive the emergency data, HTTP response codes, timestamp and data source, etc. The filters that may be applied further include time granularity, value (such as a list of number ranges for bins, text (such as a list of bin rules for location scores), mesh (such as a list of mesh bin rules for location scores), and access key (such as a list of access key bin rules).

The data binning module 305 is operative to perform scoring operations on data. For example, the data binning module 305 may score emergency data based on, but not limited to, total API call traffic volume, location accuracy, etc. A volume score may be based on the existence of a data payload and a field volume score may be based on the existence of one or more fields in a data payload. A field value score may be a scalar value of a payload field, and a field text score may be a text value of a payload field. Location scoring may be a location value of a latitude-longitude field pair in a payload.

Bins are generated by the data binning module 305 such that the filtered and scored data points are added to the bins based on a per-payload basis or on a per-call basis. In other words, the statistics module 276 can evaluate emergency data based on emergency data provided to an emergency network from the emergency data manager 100, or based on an emergency call coming in to the emergency network. The data points may be considered to be a "tally" in accordance with the various embodiments.

Put another way, the data binning module 305 generates the data bins and increments a "tally" in each bin when data matching the filtering and scoring criteria. The actual emergency data from which the tally is generated may be deleted once the binning operation is completed. In other words, the data binning module 305 may initiate counters that are incremented each time emergency data matches the defined filtering and scoring rules.

The data binning module 305 is operative to communicate with the statistics database 190 to store the generated data bins. The reporting module 307 is operative to communicate with the statistics database 190 to generate reports using the data bins. The reports may include, but are not limited to, histograms, heat maps, density plots, etc.

Figure 4:
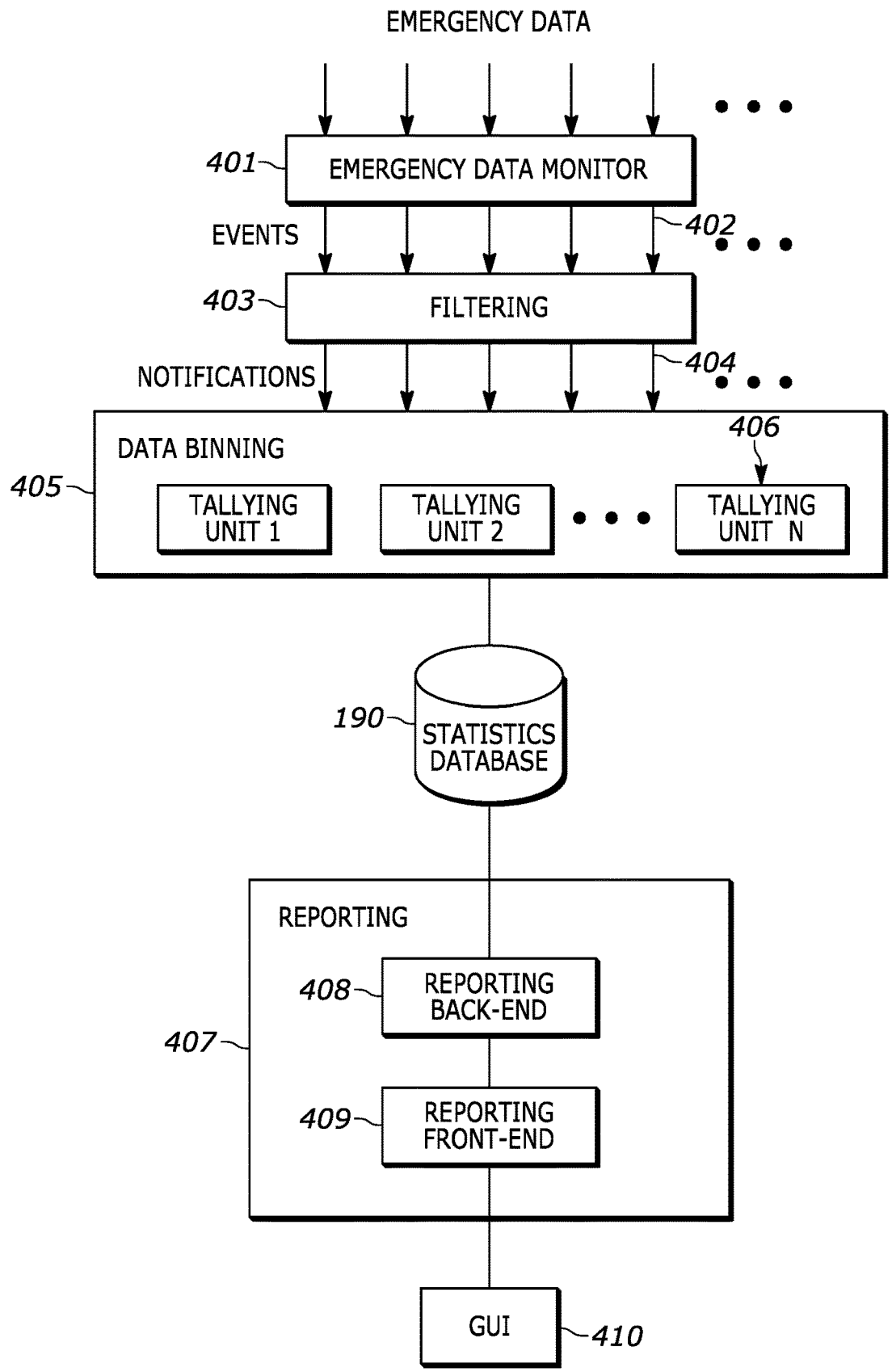
FIG. 4 is a diagram providing further details of a statistics module in accordance with one embodiment.

FIG. 4 is a diagram of a statistics module 276 in accordance with another embodiment. The emergency data monitor 401 detects the emergency data requests from the various emergency networks 170 and also emergency data being pushed from the emergency data manager 100 to the emergency networks 170, and sends events 402 to the filtering module 403. The filtering module 403 generates input notifications 404 associated with the events.

The filtering module 403 is operative to filter events using the same various criteria as filtering module 303 described with respect to FIG. 3. For events matching filtering criteria, the filtering module 403 sends the notifications 404 to the data binning module 405. In the example embodiment of FIG. 4, the binning module 405 may be considered to be composed of several tallying units from a first tallying unit through an $n^{th}$ tallying unit arranged in parallel.

The input messages or notifications 404 provide information regarding, for example an emergency payload send to an emergency network by the emergency data manger 100, or a query for emergency data sent to the emergency data manager 100 from an emergency network. The notifications 404 are posted on a message bus provided by the filtering module 403 and one of the parallel tallying units of the data binning module 405 is notified. The tallying unit consumes the notification 404, and increments a counter or tally in one or more appropriate bins. Notifications 404 may be saved in non-serialized memory with no copies, or may be saved in a memory data structure, such as Remote Dictionary Server (Redis) in the statistics database 190. Therefore, any information from the emergency data payloads in the notifications 404 are deleted after the tallying/binning operation is completed.

The notifications 404 may be saved by the data binning module 405 in time buckets, source data buckets, geo-fenced buckets, etc. Further, the notifications 404 may be saved in time buckets and are deleted or purged periodically, for example, at some predetermined minute interval such as five minutes, ten minutes, etc. Sample data regarding notifications 404 saved in a time bucket may include time bucket, application (Android, iOS), universally unique identifier (UUID), minimum uncertainty, etc.

The filtering module 403 is operative to perform filtering operations of emergency data based on time, value, text, geofence, mesh and access key, etc. A time filter can be specified as a start time and single integer in seconds. Time filters are used to determine the time bins for scoring and can be valid for all score types. If no time filter is specified for a score, the tally will record total score values from the initial enabling of the tally.

A value filter is used to determine the bins for a particular field value score. A value filter can be specified as a list of scalar values to divide scoring bins. For example, if a field value score is set for the "accuracy" field, the value filter could be set as, for example, "3, 5, 10, 15, 20, 40, 80, 100, 500, 1000, 5000, 10000" which specifies thirteen bins. That is, the lowest bin is scored to when an accuracy is observed to be lower than 3, and the highest bin is scored to when an accuracy is observed to be higher than 10000. When a value filter is specified on a per-call basis, additional parameters must be employed to specify the statistical measure of interest over all payloads in the call, i.e., "min", "max", "average", or "median". In other words, for value filters, when tracked on a per-call basis scoring is performed as a statistical measure over all payloads in the call. In this case, payload values are buffered and bin scoring/tallying is deferred tally until a call is complete. A timer may be set such that a timeout occurs after a predetermined time limit subsequent to receipt of the last payload in a call, or at the termination of a predetermined data retention time limit.

A text filter is used to determine the bins for a particular field text score. The text filter allows for bins to be defined by one or more strings that the field may contain. Thus, a bin may be related to only a single string. For example, to filter based on a "carrier" field in a payload, a text filter may be specified using the names of various cellular carriers, for example, "carrier name 1", "carrier name 2," . . . , etc. More complex text filters defined by several strings may be specified as a list of lists. For example, for a given text field the filter specified by two lists: (A, B, C), (D, E, F) specifies two bins. The first bin would be scored for the occurrence of "A", "B", or "C", and the second bin would be scored for the occurrence of "D", "E" of "F". The statistics module 276 will automatically create a bin for other text strings that do not match any of the specified text filters. The text filter may also be a case-sensitive or case-insensitive filter, and may specify exclusions such that various data points are ignored, such as faux session data used for system testing purposes.

A geofence filter is used to determine bins for a particular location score. A geofence filter allows for bins to be specified using a list of named geofences. For example, if a score is to be filtered based on data occurrence related to the Boston police department or the Chicago police department, and each has the geofences named "Boston-PD-Geofence," and "Chicago-PD-Geofence, respectively, then the geofence filter may be specified as "Boston-PD-Geofence, Chicago-PD-Geofence." Alternatively, a geofence filter may specify "all" such that a bin would be generated for each geofence being served by the emergency data manager 100.

The statistics module 276 is operative to filter emergency data from multiple geofences. Put another way, statistics data can be gathered from a group of geofences by specifying a filter using a tag common to the group. For example, geofences may be tagged to indicate a specific type of data in common to each geofence. The tag name may then be used to specify the filter. As a specific example, a "taxi-reporting" geofence tag would indicate that each geofence having this tag is a region in which there is data flow related to a taxi/ride-sharing service. A filter specified using the "taxi-reporting" tag would gather statistical data related to the taxi/ride-sharing service into a bin for each geofence. As additional geofences are tagged with the "taxi-reporting" tag, or as geofences are untagged, the number of bins will increase or decrease accordingly. Additionally, when geofence filters are specified, the statistics module 276 will automatically create an additional bin for "other" locations that do not match any of the specified geofences.

The emergency data manager 100 receives location data from devices 160 upon initiation of an emergency alert or emergency call. The statistics module 276 is operative to perform per-call filtering and binning based on first location scores, last location scores, all locations score, etc. When location data is received by the emergency data manager 100, the statistics module 276 is operative to associate the incoming location data with an emergency call received by an emergency network. Session-based data related to system events such as location data received by the emergency data manger 100 and emergency data queries received by the emergency data manger 100 from emergency networks can be associated with one or more filters for purposes of gathering statistical data. Time-stamps on emergency data is used as a unique identifier for an event.

A mesh filter is used to determine the bins for a particular location score. A mesh filter enables specification of a geographic area without the necessity of specifying a geofence and is specified as a regular rectangular grid in latitude-longitude space. Specifically, a grid can be defined by specifying a top left latitude-longitude point, a bottom right latitude-longitude point, and the mesh dimensions in the horizontal and vertical (X and Y) directions as a number of bins. For example, a 5×10 mesh grid can be defined as "top-left: 0,10 bottom-right: 10,0 dimensions: 5, 10". A mesh filter may be used to specify a specific region of interest within a geofenced region.

An access key filter, based on access requirements for a given emergency network, may be used to add bins for any score, and can be specified as a list of named access keys. For example, if a score is to be filtered based on whether data is accessed in Boston or Chicago, an access key filter can be specified as, for example, "Boston-PD-Prod-Key, Chicago-PD-Prod-Key." An access key filter specification of "all" would generate a separate bin for each of the access keys in the system. As additional access keys are added or removed, the number of bins will increase or decrease accordingly. As is the case with other filters, when access key filters are specified, the statistics module 276 will automatically create an additional bin for "other" accesses that do not match any of the specified access keys.

In conjunction with any of the above described filters, the data binning module 405 is operative to generate multiple reporting tallies or bins for each location interface with the emergency data manager 100, such as, but not limited to, Advanced Mobile Location (AML) or emergency location service (ELS). Each tally can also likewise correspond to one interface. Each bin tally is evaluated against each emergency data payload passing through the interface, at the appropriate time in the flow of the application. The data binning module 405 is operative to perform the same operations as the data binning module 305 described with respect to the example embodiment of FIG. 3, and is likewise operative to store bins as statistics data in the statistics database 190. Each data bin is incremented by the data binning module 405 if a pattern match on a given filter is found for that bins score, or not incremented if no filter pattern match is found. The location interfaces to the emergency data manager 100 may have statistics gathered by the statistics module 276 for any of the following filtering or binning parameters: latitude, longitude, uncertainty, altitude, altitude uncertainty, and wireless_carrier.

The data binning module 405 is operative to evaluate emergency data payloads sent from the emergency data manager 100 to an emergency network, and generate a tally corresponding a score bin based on the evaluation. The tallies may be performed on a per-payload basis or a per-call basis. Filtering and binning (i.e. scoring) is specified by parameters sets relevant to each. The data binning module 405 is operative to perform binning operations based on volume, field volume, field value, field text, and location, etc.

A volume score may be evaluated on per payload basis. A volume score on a given interface generally does not require any parameters to specify because the score is based only on the appearance of a payload on the given interface. A volume score can also be applied to a specific field of an emergency data payload. In that case, a "field volume" score can be specified by the various available field names, and a tally will be generated by the data binning module 405 when a data payload contains the specified field or fields. For example, to score the volume of emergency data payloads that are received with a field named "altitude" the field name "altitude" may be specified as a binning parameter.

The binning operations may also be specified using Boolean logical operators such as "AND," "OR," "XOR," and "NOT." For example, to score the volume of payloads that are received with an "altitude" field and an "altitude uncertainty" field, both fields may be specified as score parameters using a logical AND operator to create a combined bin, or a logical OR operator to create separate bins.

A field value score may be evaluated on a per-payload basis, where a specified field has a certain value. A field value score is useful when combined with a value filter, otherwise it would return the same result as a field volume score binning operation. A field value score requires at least one field name to be specified. A field text score may be evaluated on a per-payload basis, and a tally added to a bin whenever a payload includes a specified field having text content. Similar to a field value score, a field text score is only useful when combined with a related filter, in this case a text filter, otherwise it would return the same result as a field volume score binning operation. Location scoring also may be evaluated on a per-payload basis and a tally added to a bin whenever a valid location is present in one or more specified fields. Location scoring requires at least two specified field names, one for latitude and one for longitude. Location scoring must be combined with a mesh filter or a geofence filter, otherwise it would return the same result as a field volume score binning operation.

All of the filtering and binning operations described above, except for value filters, may be scored once-per-call, per filter value. Time filters, by definition, are always scored only once per call. In an example of per-call filtering and scoring, if ten emergency data payloads during an emergency call all match a particular geofence filter in a location score, that bin is scored to only once for that emergency call. Further if seven of the ten emergency data payloads matched one geofence and three matched a different geofence (e.g. if the caller was moving), each geofence would have a separate bin that would be scored to once. In another example in which an access key filter is employed, if some emergency data payloads related to a given, specific emergency call are accessed with one API key, and other emergency data payloads related to the same emergency call are accessed by another API key, then each API key would have a bin which would be scored to once for the given emergency call. In another example in which a text filter specified for a "positioning_method" field is employed, if some emergency data payloads related to a given, specific emergency call have a "positioning_method" field value of "MIXED," and some have a "positioning_method" field value of "WIFI", a WIFI bin and a MIXED bin will each receive a tally once for the given emergency call.

Filters and scoring may be specified using the GUI 410 provided by the reporting module 407. The reporting front-end 409 enables textual inputs to specify desired statistics data collection activities as well as report generation. A pseudo-specification for filtering and scoring operations that may be entered using the GUI 410 is provided below:

Bin/Tally 0
Score: Volume
Filters
    0—Time
      3600
    1—Access Key
      All
Bin/Tally 1
Score: Field Value
Filters
    0—Time
      3600
    1—Access Key
      all
    2—Value
      uncertainty
      mesh: 0, 10000, 1000
    3—Value
      altitude
      mesh: −100, 1000, 50
    4—Value
      altitude uncertainty
      3, 10, 30, 60, 100, 500, 1000
Bin/Tally 2
Score: Field Text
Filters
    0—Time
      3600
    1—Access Key
      all
    2—Text
      wireless_carrier
      Verizon, (AT&T, ATT), Sprint, (T-Mobile, TMobile)
Bin/Tally 3
Score: Location
Filters
    0—Time
      3600
    1—Access Key
      all
    2—Geofence
      all
    3—Mesh
      top-left: 49.3457868, −124.7844079 bottom-right: −66.9513812, 24.7433195 dimensions: 100, 100
      top-left: 49.3457868, −124.7844079 bottom-right: −66.9513812, 24.7433195 dimensions: 10000, 10000

Upon entry of a filtering and scoring specification like the example above, the statistics module 276 will initiate statistics gathering and will score the various specified bin by tallying based on pattern matching, index calculation, or both, for each specified filter. The statistic module is operative to maintain privacy and security of emergency data because the data payloads themselves are not transmitted over any busses that are accessible to other services. In other words, the statistics module 276, which may reside within the emergency data manager 100, processes the emergency data to generate statistical data very close to where the emergency data is handled during normal operation of the interface. For example, in some embodiments, may be performed inside interface services, such that only bin indices or identifiers are transmitted out to other processing and storage.

Additionally, the statistics module 276 is operative to process emergency data from the emergency data payloads without blocking operation or otherwise interfering with, or delaying, the interfaces over which the emergency data payloads are flowing. Because the statistics module 276 is operative to gather statistics data in real-time or near real-time, the statistics module 276 enables continuous monitoring of the robustness and stability of the system. For example, the statistics module 276 can be used for early detection of mass emergencies, identifying denial of service attacks, etc. across several hundred emergency networks.

The statistics module 276 is operative to aggregate gathered statistical data, such as aggregation of various bins, and is also operative to identify and remove data redundancies by, for example, using a universally unique identifier (UUID) associated with the data. Multiple notifications 404 may be related to the same emergency event or system event associated with a user identifier such as a phone number. For an on-going emergency call, such related notifications 404 may be received periodically. The statistics module 276 is operative to identify the first instance of a user identifier in an emergency call or emergency alert, and remove redundancies in statistical data using the user identifier.

In some embodiments, the data retrieval modules 271 are operative to generate and assign a deterministic random identifier or a UUID to user identifiers related to emergency data being obtained by the emergency data manager 100. In other embodiments, the statistics module 276 performs the UUID generation and assignment. In such embodiments, the statistics module 276 may assign a UUID to user identifier in conjunction with notifications 404 passing from the filtering module to the data binning module. A UUID table key may be used to keep track of the assignments to the various user identifiers. The UUID table key may be saved in-memory 231 of the emergency data manager 100, or in the statistics database 190, using for example, a Remote Dictionary Server (Redis) data structure. The data binning module 305 in FIG. 3 and the data binning module 405 in FIG. 4 are operative to identify the first occurrence of a UUID, and subsequent occurrences, to avoid double tallying for the same event.

Similar to the reporting module 307 described with respect to the example embodiment of FIG. 3, the reporting module 407 is operative to communicate with the statistics database 190 to generate reports using the data bins, which may include, but are not limited to, histograms, heat maps, density plots, etc. The reporting module 407 includes a reporting back-end 408 and a reporting front-end 409 which provides a reporting GUI 410. The tallies and metrics from the multiple tallying units of the binning module 405 are aggregated and may be provided to the reporting back-end 408. A user may access the GUI 410 and request a report based on specific parameters such as time window, geofence, etc. and the reports are generated by the reporting back-end 408 and displayed on the GUI 410 by the reporting front-end 409.

The statistics database 190 may be implemented as a PostgreSQL database which is updated by the data binning module and stores the generated data bins. The schema of the statistics database 190 can be created dynamically and is driven from the filtering and data binning modules, as well as the reporting back-end 409, which in some embodiments may be implemented as middle tier processing having knowledge of the specifics of each statistics report needed.

The reporting module 307 in FIG. 3 as well as the reporting module 407 in FIG. 4 may be implemented using Python objects containing data holders. Each object can be assigned to one or more "Sources" (or message types, message originators, etc.) while its data holder reflects how to process the information as it is contained in received messages. The messages can be created by the relative top-level services that process emergency data flowing into the emergency data manager 100 and can be published to a messaging bus used by the statistics module 276. For example, these messages can be consumed by a back-end service of the statistics module 276, such that the messages are routed to corresponding objects. An object state may be stored for a predetermined time in the service and periodically serialized to the statistics database 190. To achieve horizontal scaling, multiple instances can coexist and consume messages in a "worker" fashion.

The reporting modules may support various services which can expose various supported reports as a REST API to be consumed from the GUI 410 via the reporting-front end, which in some embodiments may be implemented as another service. For each report the statistics module 276 may provide a preprocessing layer to transform the data from what is stored in the statistics database 190 to given report format.

The statistics module 276 is also operative to segregate emergency data obtained from different source, such as location data from medical data, etc. and to limit report access for given data types to provide additional privacy and security of the information at the reporting end.

The statistics module 276 also provides on-demand queries for processing and usage in other contexts other than statistics reporting. The GUI 410 can be used to configure various queries, or queries may be made to the emergency data manager 100 and to the statistics module 276 by authorized users of emergency networks. Example query interfaces may include: retrieval of a bin/tally structure and bin data retrieval. Bin structure retrieval may be filtered using any of the filters available for statistics data acquisition and aggregation, and data retrieval and reports may be processed as timeseries, histograms, fractions, etc.

Various performance statistics are captured and reportable via the statistics module 276 such as, but not limited to, call volume serviced; call volume not serviced, including categories such as: data that was available but not requested, data that was requested but not available, and data that was requested, and was available, but sending the data failed for some indicated reason. Other available performance statistics captured and reportable include, emergency data queries initiated by incorrect or unauthorized emergency networks; locations returned with incorrect city of caller location, call volume breakdowns by emergency network and by population served, and incoming emergency data filtering information such as volume of calls for which data was dropped; volume of calls for each emergency network that was expected to handle calls for which data was dropped, and volume of calls for which an emergency network queried for location, but for which location was not delivered due to the reported caller location falling outside the emergency network's service area inclusive of safety margin. The statistics module 276 is also operative to aggregate statistical data related to horizontal and vertical uncertainty of locations.

The reporting module 407 is operative to generate reports such as traffic volume time series graphs, histograms, statistics charts, etc. The traffic volume time series graphs may be generated using statistics data in the statistics database 190 that is stored as hourly data, e.g., with 48-hour lookback; stored as daily data, e.g., with 3 months lookback; or stored as monthly data, e.g., with two-year lookback. All of the traffic volume time series graphs are filterable based on one or more criteria.

Traffic volume maps can be generated that consist of polygonal geofence features corresponding to filtering or reporting geofences. Additionally, generated maps can be customized using the GUI 410 using a time control to change the time scope of the map, a color control to change the metric by which the features are colored, and can be stored as monthly data, for example, with a two-year lookback, etc. Maps can be generated to show incoming and outgoing emergency data, to and from the emergency data manager 100 or to and from a given emergency network, on a geofence map for a specific emergency network. Such geofence maps may also be customized for a selected time range, coloring options, etc. Traffic volume chart can also be generated for incoming and outgoing emergency data per geofence and may display inbound call volume received and inbound call volume delivered, etc.

Data requests made to emergency networks can be charted, such as total inbound request volume, inbound request volume where emergency location was delivered in response to the query, and inbound request volume to all emergency network location-requesting endpoints, where other location was delivered in response to the query. All of these chart types can be filtered and displayed by geofence. Traffic volume charts can be configured to show inbound request volume to all location-requesting endpoints where data was present but not returned due to credential-geofence filtering, incoming and outgoing data filtered by geofence, and inbound HTTP request volume dropped due to being outside covered geofences. Each geofence filtered chart may also be setup for a selected time interval. The geofences may have various configurations, such as, but not limited to: an entire U.S. state, a local emergency network jurisdictional boundary, a coarse rectilinear mesh with any arbitrarily defined boundary, etc.

Statistics charts may also be generated for a specific time interval and can be stored as monthly data, for example, with a two-year lookback or some other time interval, etc. Charts can be created as: a histogram of horizontal uncertainty with an x-axis being horizontal uncertainty bins for 50 bins of equal size and a y-axis being the normalized fraction in bins of all payloads received; a cumulative distribution function (CDF) of horizontal uncertainty with an x-axis being horizontal uncertainty and a y-axis being normalized fraction of all payloads received; a histogram of vertical uncertainty with an x-axis being vertical uncertainty bins with 50 bins of equal size and a y-axis being a normalized fraction of all payloads received; and a CDF of vertical uncertainty with an x-axis being vertical uncertainty and a y-axis being a normalized fraction of all payloads received.

Figure 5:
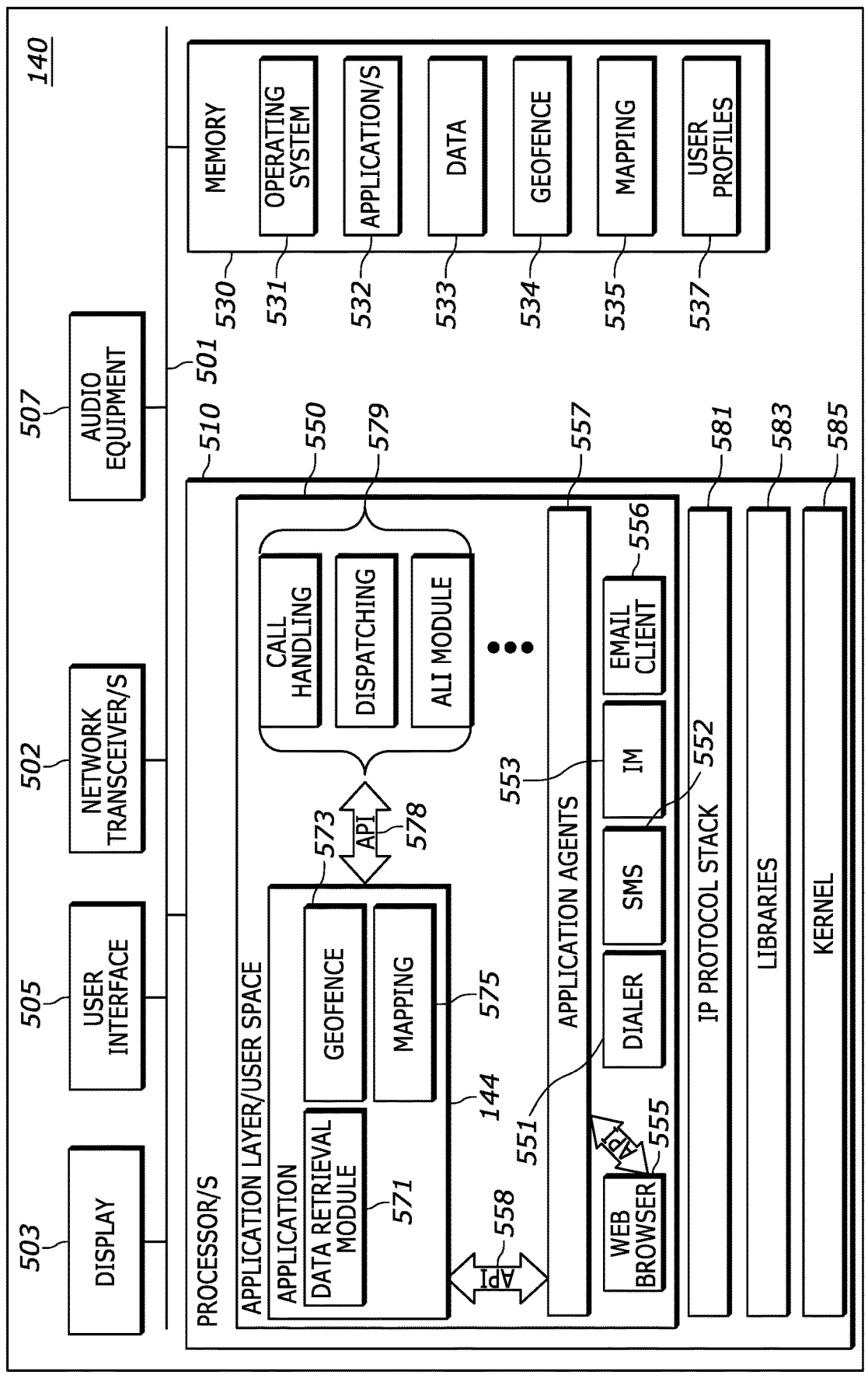
FIG. 5 is a diagram of an example emergency network workstation.

FIG. 5 provides an example emergency network workstation 140 which may be a call handling workstation, a CAD workstation, etc., which are examples of emergency network entities. An emergency network may be implemented with multiple emergency network entities of various kinds and therefore may have multiple workstations for example one or more call handling workstations, one or more CAD workstations, etc., in addition to routers, switches, hubs, access points, and other emergency network entities, etc. The example workstation 140 may include a display 503, a user interface 505, audio equipment 507, network transceiver/s 502, at least one processor 510, and at least one non-volatile, non-transitory memory 530 in addition to RAM. The network components may include one or more network transceivers for Ethernet connectivity to other workstations and devices and an Internet connection. The memory 530 stores executable instructions and data such as executable instructions for an operating system 531 and various applications 532. The memory 530 also stores data 533 which may provide data caching.

The processor 510 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 510 is configured and operative to fetch and execute computer-readable instructions (i.e. executable instructions) stored in the memory 530. For example, the applications 532 executable instructions, when executed by the at least one processor 510, may provide an operating system, a dialer application 551, a short-message-service (SMS) application 552, an instant message (IM) application 553, a web browser 555, an email client 556 and one or more IM and voice applications which may each provide IM and voice call capability separately or in combination. The operating system may include a kernel 585, libraries 583 (also referred to as "application programming interfaces" or APIs) and an application layer 550 or user space within which the various applications are executed, and an IP protocol stack 581.

The applications 532 executable instructions, when executed by the at least one processor 510, may also provide the emergency response application 144, and an associated GUI, and various emergency network applications 579 such as, a call handling application, dispatching application, Automatic Location Identification (ALI) module and an emergency alert module. In some implementations, the emergency response application 144 may have a component that communicates with the emergency data manager 100. However, in other implementations, the Web browser 555 may provide the GUI 142 and GUI 143 enabling communication with a cloud-based application resident on the emergency data manager 100. In that case, the Web browser 555 communicates with the emergency data manager 100. In either implementation, communication is established between the workstation 140 and the emergency data manager 100 using the IP protocol stack 581 and a network connection is established which may be a TCP connection and which may include one or more WebSocket connections.

The emergency response application 144 may include geofence 534 executable instructions and mapping 535 executable instructions to implement a geofence module 573 and a mapping module 575. The data retrieval module 571 may communicate with the emergency data manager 100 to retrieve emergency data. The emergency data may be received by the workstation 140 via push operations from the emergency data manager 100 or may receive the emergency data as streaming data over a streaming connection. Application agents 557 may use APIs 558 to establish operative coupling between the emergency response application 144, the web browser 555, the IP protocol stack 581 and the various emergency network applications 579 and other applications executed by the at least one processor 510.

The geofence module 573 is for managing geofence data for the emergency network including assigning geofences to one or more responders or ESP members, etc. An ALI module provides location information obtained from an Automatic Location Identification (ALI) feed into the emergency network, and a mapping module 575 displays information on a map on the display 503. The geofence module 573 is operative to provide an interface, such as a GUI, for an ESP user to manage and input geofences including shape files, such as GIS shape files, and other GIS data. The workstation 140 may also include a dispatch module for communication with emergency responders.

All of the components of the workstation 140 are operatively coupled by an internal communication bus 501. The display 503 is operatively coupled to the user interface 505 or may be considered a part of the user interface 505 such as in the case of a touchscreen which is both a display and a user interface in that it provides an interface to receive user input or user interactions. The user interface 505 includes a mouse and keyboard and the audio equipment 507 may include a microphone and a speaker.

The call handling module may include a call-handling application that emergency network personnel, such as PSAP personnel, may interact with to send an emergency data request to the emergency data manager 100. The response from the emergency data manager 100 is displayed at the display 503. Emergency data may include locations and additional data. Emergency data may further include one or more emergency data categories, also referred to as "data categories". The emergency data categories may include, for example: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. Emergency data categories may be tagged with tags for specific types of data such as "demographics" or "medical data." For example, gender, height, weight, ethnicity, profile picture (image-url) may be tagged as demographic data. Medical data protected under HIPAA and other laws may be tagged as "HIPAA" or "private." Medical data may include information on one or more of allergies, medical conditions or illnesses, medications, disabilities, blood type, medical notes, and other medical information. Medical information protected under HIPAA are encrypted and/or anonymized. Some data are tagged as "general" or another similar tag, wherein access is not specifically restricted. User profiles 537 stored in memory 530 contain data that determines which staff members can access the workstation 140 as well as certain applications.

The emergency data manager 100 may store emergency data requested by an emergency network entity such as workstation 140 in a remote database for a certain period of time after receiving the request for the emergency data regarding a user and any electronic devices 160. A purge period of time may be set as a timer value, such as a timer countdown or a set time point, which may be defined by the emergency network that sent the emergency data request. An emergency data purge period may be, for example an interval between one to forty-eight hours, or between one to twelve hours. However, a purge period may be less than one hour due to security and privacy concerns, such as between one and forty-five minutes, or any time interval from five to thirty minutes.

After a timer for an emergency data purge has expired, and if no new requests for the emergency data pertaining to the particular user and the particular electronic device 160, or other devices associated with the user, are received, the emergency data manager 100 may mark any particular related database entries for deletion and wait for another, different, time-out interval. After a particular second time-out interval has also been completed, and if no new requests for location data for the particular user or associated electronic devices 160 are received, then the emergency data manager 100 may remove the specific marked entries from the databases in the next cycle of database updates.

After adding the emergency data in a database, the emergency data manager 100 may proceed to keep updating the emergency data on a periodic, or as-needed basis. In other words, the data regarding a user or electronic device 160 is kept current such that the most recent and accurate emergency data can be provided to emergency responders. The emergency data manager 100 is updated with emergency data from devices 160 for all the emergency data pertaining to all users and their associated electronic devices 160. As an alternative to having a purge period defined by a timer, a purge period may be based on an on-going emergency call. For session-based purging, emergency data may be deleted after the emergency session has been terminated. To further ensure that the specific emergency data is no longer required, session-based emergency data purging may be performed after a predetermined time delay following emergency session termination, such as a time delay of between one and fifty minutes. A time delay is also beneficial in the case of dropped calls, follow-up calls, etc.

In some non-emergency situations, there is a need to access location data, user data, emergency data or sensor data. For example, a user of an electronic device 160 may grant authorization to family members to access the user's location data. Accordingly, if a family member requests location data for a user, access is granted if there is proper authorization. In another example of location data access, an employee may be required to share location data with an employer, for example through a corporate operations center, such that the corporate operations center is notified when the employee is in an emergency. In another example, a taxi operations company may request and obtain location data of one or more fleet members to keep track of its vehicles, for example, via an onboard vehicle console or terminal. All of these location data accesses are monitored by the statistics module 276 and are subject to statistics data reporting for location data access and delivery.

The emergency data manager 100 is operative to filter all incoming emergency data related to devices 160, by geofences. Emergency networks utilize geofences that define jurisdictional boundaries within which a specific emergency network is authorized to responds to emergency. For example, a city police department may have jurisdictional authority over the entire city, or of only a portion of the city. A geofence would represent the perimeter of the portion of the city that the respective police department serves. A geofence may therefore be considered a representation of a virtual perimeter overlaying a real-world geographic area.

Geofences may be used to define a county boundary, a state boundary, a collection of postal/zip codes, a collection of cell sectors, or etc. A geofence may be defined using simple shapes such as rectangle, triangle, circle, etc., or may be defined using complex polygons, etc. Geofences may also refer to approximations where the "approximated" geofence encloses an approximation of a jurisdictional boundary or some other boundary and may also include buffer regions extending outside the perimeter, for example one-mile or such beyond the primary geofence perimeter.

Some geofences can be dynamically generated by the emergency data manager 100. For example, a dynamic geofence may be generated as a radius around a point location at which an emergency is occurring. In another example, a geofence may be represent non-emergency network boundaries such as school zones or neighborhood boundaries, etc. The use of a geofence is referred to as geofencing. One example of geofencing involves a location-aware device or a location-based service (LBS) monitoring when the device enters or exits a given geofence. This means that the device is monitored within the geographic boundaries defined by the given geofence. Entry or exit from given geofence by the device may trigger an alert to the device's user as well as messaging a given network monitoring the geofence. The monitoring network may be an emergency network but could be other types of networks as well. The geofence information may contain the device location, which could be sent to a mobile telephone, an email account or to some other system or network entity.

In the context of emergency services, one or more geofences may correspond to the jurisdictional boundaries of an emergency network. The emergency network may be operated by a public entity and may be for example, a public safety answering point (PSAP), a police department, a fire department, a federal disaster management agency, national highway police, etc., which have jurisdiction over a designated area and, sometimes, overlapping areas. Geofences are used to define the jurisdictional boundaries using various Geographic Information System (GIS) formats. A GIS file format refers to one or more standards for encoding geographical information into a computer file.

For maintaining the privacy, security and integrity of emergency data, geofencing is applied to ensure that emergency data flows only the emergency network having authority to access the information and responds to the given emergency. Applying geofence filters to the emergency data also allows additional avenues for monitoring, both visibility and control, over the emergency data manager 100 to detect anomalies or spikes and to reduce the risk of security breaches. The statistics module 276 monitors all accesses to emergency data, both incoming and outgoing from the emergency data manger 100 and is operative to generate a variety of reports as discussed above.

Figure 6:
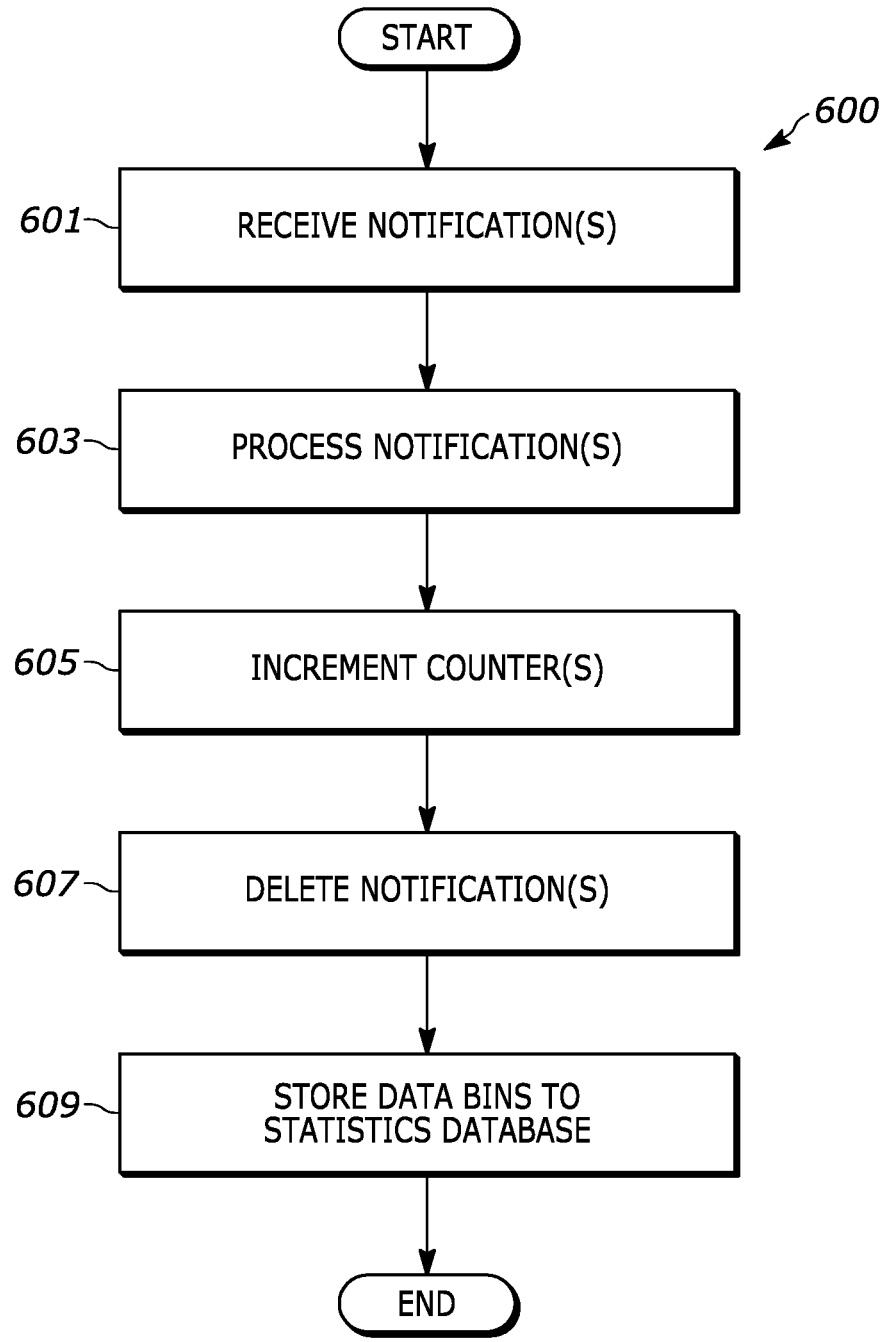
FIG. 6 is a flowchart of a method of operation in accordance with various embodiments.

FIG. 6 is a flow chart illustrating a method of operation 600 of the statistics module 276 according to the example embodiment illustrated in FIG. 4. The method of operation begins and in operation block 601, one or more notifications 404 are received based on emergency events 402. The emergency events 402 include, but are not limited to, emergency sessions such as emergency calls 103, emergency alerts 105, etc. that may have associated emergency data that may be obtained from various sources such as devices 160, databases 120, or other sources or combinations of these.

The emergency data monitor 401 detects incoming emergency events 402 which are passed to the filtering module 403. In operation block 603, the filtering module 403 applies any specified filters to the incoming emergency data associated with the events 402. The emergency data is obtained from various sources by the emergency data manager 100. The results of the emergency data filtering operation are referred to as notifications, which are passed to the data binning module 405. In operation block 605, various tallying units 406 within the data binning module 405 apply scoring criteria and create bins in accordance with the specified filtering and scoring criteria. Any emergency data meeting the filtering and scoring criteria is tallied into an appropriate data bin by, for example, incrementing a counter as in operation block 605.

In operation block 607, the notifications 404 that have been tallied in operation block 605 are deleted. Additionally, the emergency data related to the events 402 and notifications 404 is subjected to purging based on a time specification as was described herein. The actual emergency data, which may include PII, is not stored or maintained by the statistical tallying process thereby maintaining data privacy. In operation block 609, the data bins are stored in the statistics database 190 and the method of operation terminates as shown.

Figure 7:
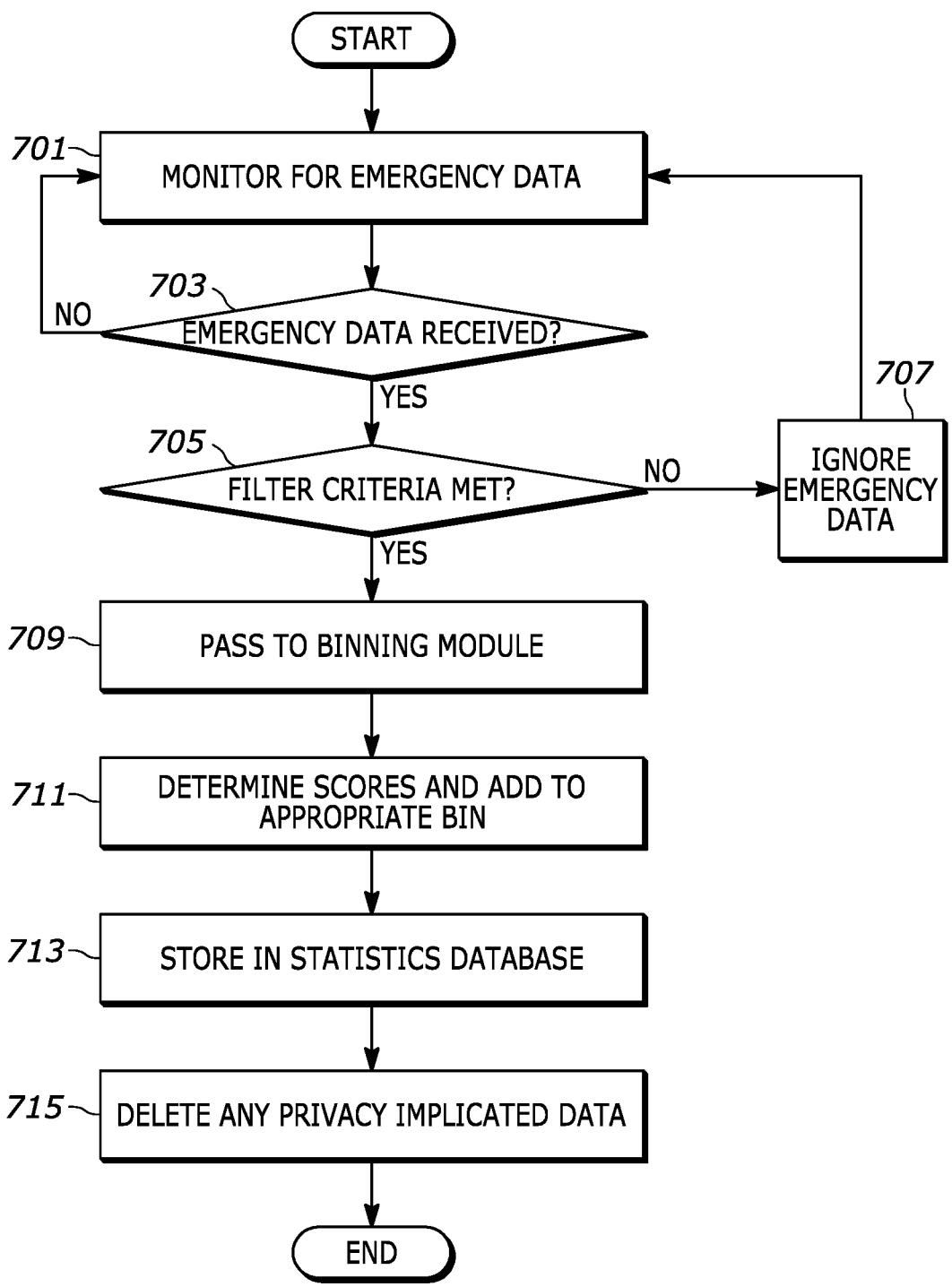
FIG. 7 is a flowchart of a method of operation in accordance with various embodiment.

FIG. 7 is a flow chart illustrating another method of operation of a statistics module 276 according to the example embodiment illustrated in FIG. 3.

The method of operation begins and in operation block 701, the emergency data monitor 301 monitors for emergency data obtained by the emergency data manager 100. If no emergency data is detected in decision block 703, the emergency data monitor 301 continues to monitor for emergency data continuously in operation block 701. If emergency data is detected by the emergency data monitor 301 in decision block 703, then the emergency data monitor 301 passes the emergency data to the filtering module 303. In decision block 705, the filtering module 303 determines if the emergency data meets one or more filtering criteria. If the emergency data does not meet any of the filtering criteria in decision block 705, then the filtering module 303 ignores the emergency data in operation block 707, and the emergency data monitor 301 continues to monitor for emergency data continuously in operation block 701.

If the emergency data does not meet any of the filtering criteria in decision block 705, then in operation block 709 the filtering module 303 passes the emergency data to the data binning module 305 for scoring and tallying. In operation block 711, the data binning module 305 determines the appropriate scores for the emergency data and increments a tally in an appropriate bin which is also generated by the data binning module 305. In operation block 713, the data binning module 305 stores the statistical data bins in the statistics database 190 and also makes the bins available to the reporting module 307 for generating real-time reports, or for subsequent report generation. In operation block 715, the statistics module 276 deletes any privacy implicated data from to maintain data privacy, and the method of operation terminates as shown.

Figure 8:
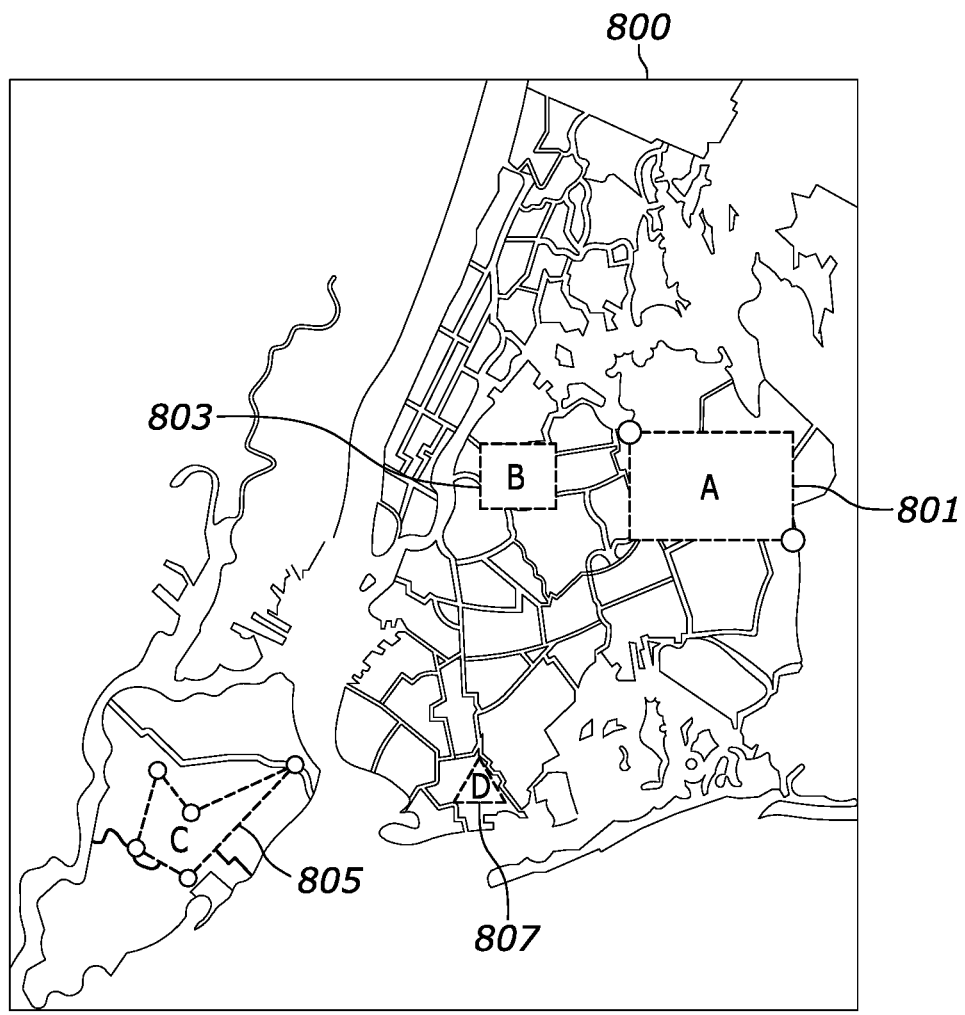
FIG. 8 is an example workstation graphical user interface (GUI) showing a map view and various geofences having complex polygonal boundaries.

FIG. 8 is an example workstation 140 graphical user interface (GUI) 143 showing a map view and various geofences having complex polygonal boundaries. In the example GUI 143 of FIG. 8, first geofence 801 is shown having a rectangular shape defined by an upper leftmost coordinate and a lower rightmost coordinate to form perimeter "A". A second geofence 803, which is also rectangular, defines a perimeter "B", and third geofence 805 is defined by a complex polygon defining a perimeter "C." Each of the geofences displayed on the GUI 143 may be associated with a single emergency network and define the jurisdictional boundaries for that emergency network. Alternatively, each geofence may be serviced by a different emergency network or some other arrangement. In any case, emergency data associated with any of the geofences will be monitored by the statistics module 276 and incoming emergency data will be filtered according the methods of operation described with respect to FIG. 6 and FIG. 7 and the example embodiments illustrated in FIG. 3 and FIG. 4.

Figure 9:
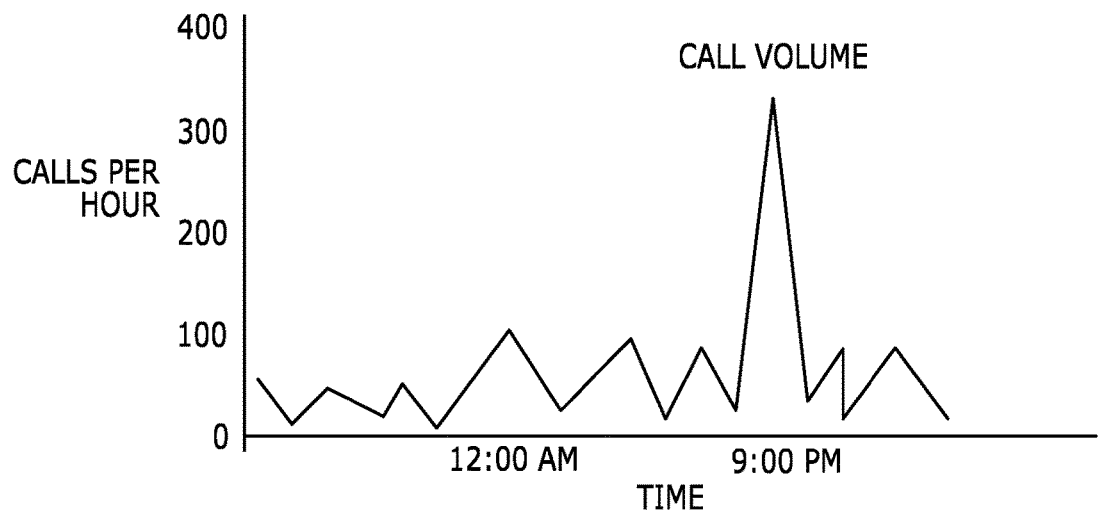
FIG. 9 is an example statistics report of call volume.
Figure 10:
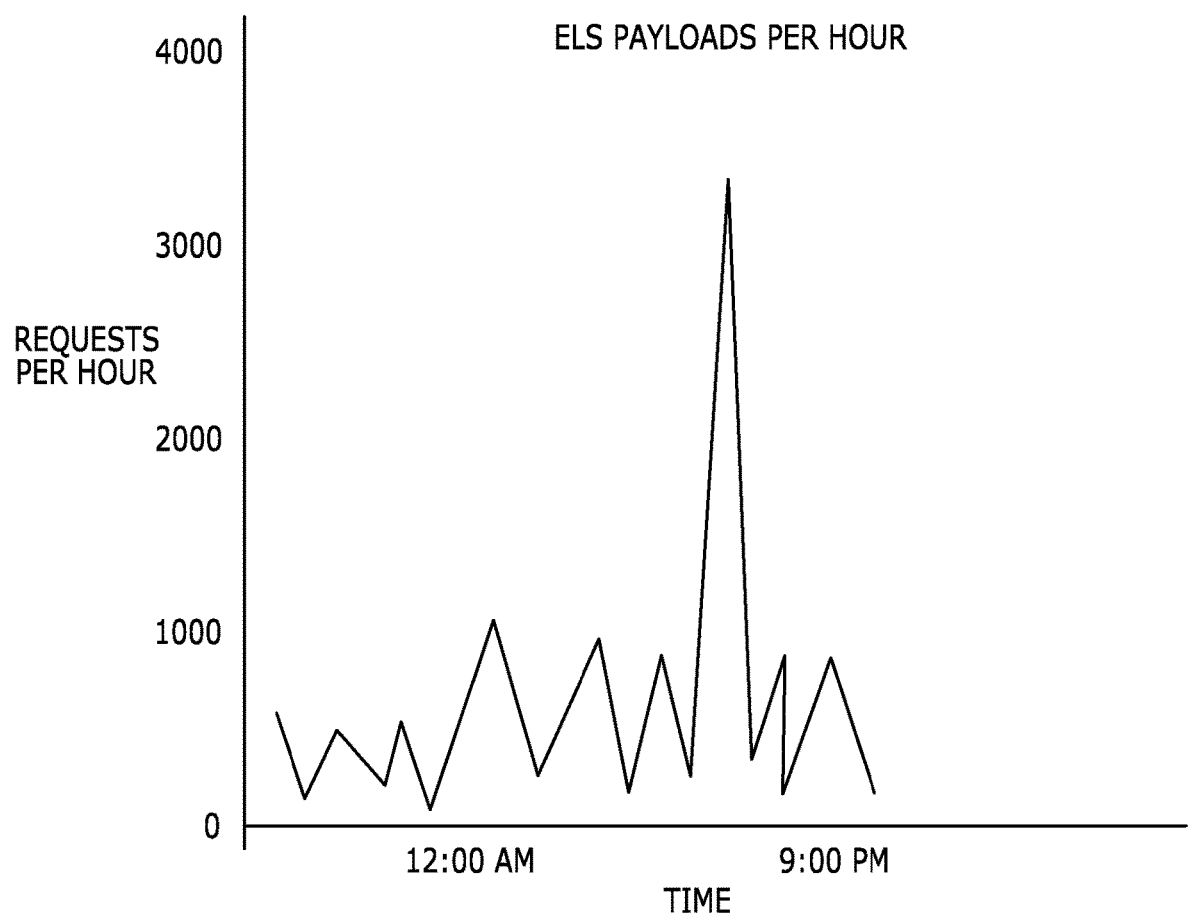
FIG. 10 is an example statistics report of emergency location service (ELS) data payloads per hour.

FIG. 9 is an example statistics report of call volume report, in calls per hour versus time, that may be generated by the statistics module 276 using the reporting module. FIG. 10 is an example statistics report of emergency location service (ELS) data payloads per hour in requests per hour versus time. The "requests per hour" represents request for emergency data received by the emergency data manager 100.

Figure 11:
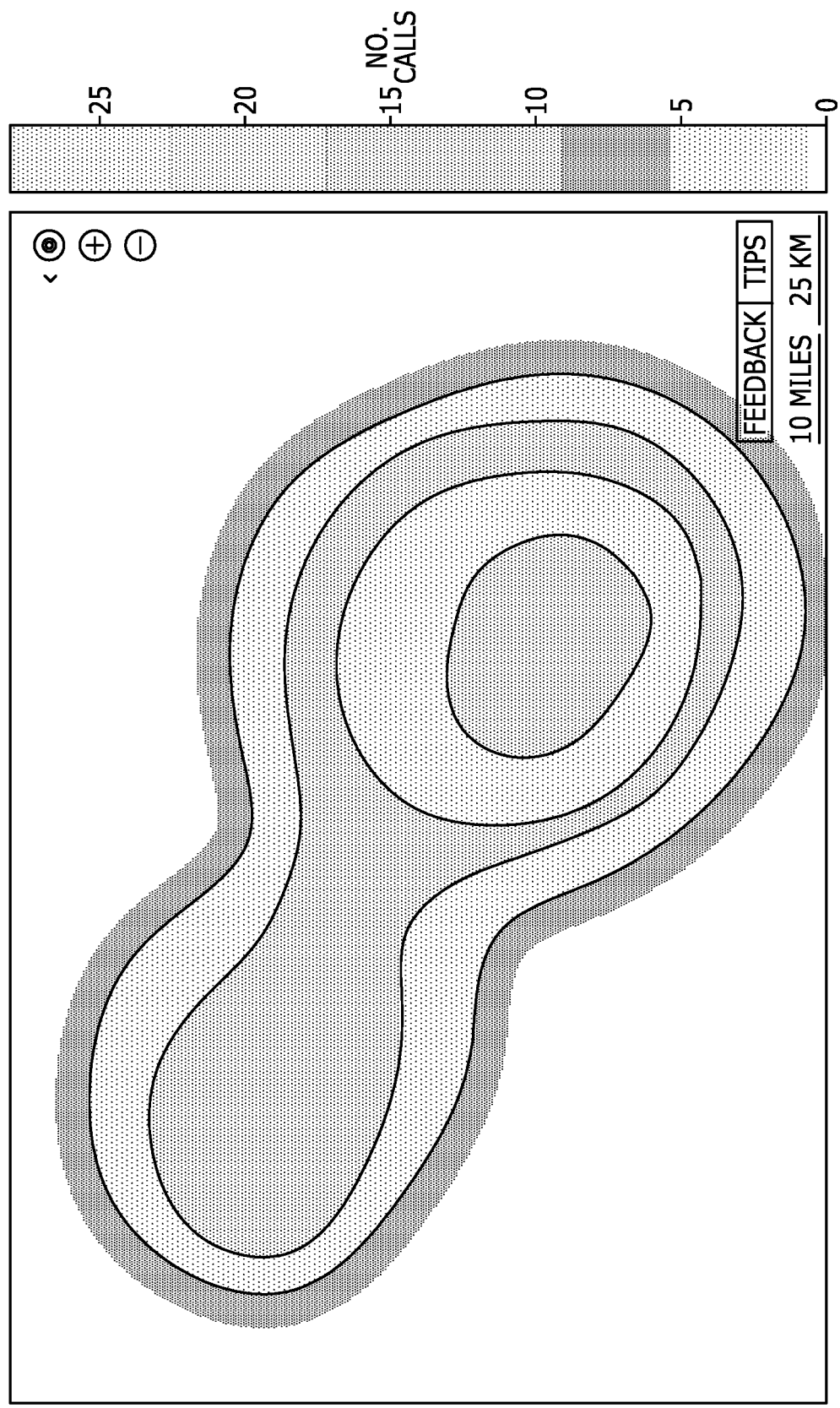
FIG. 11 is an example statistics report in a heat map format.
Figure 12:
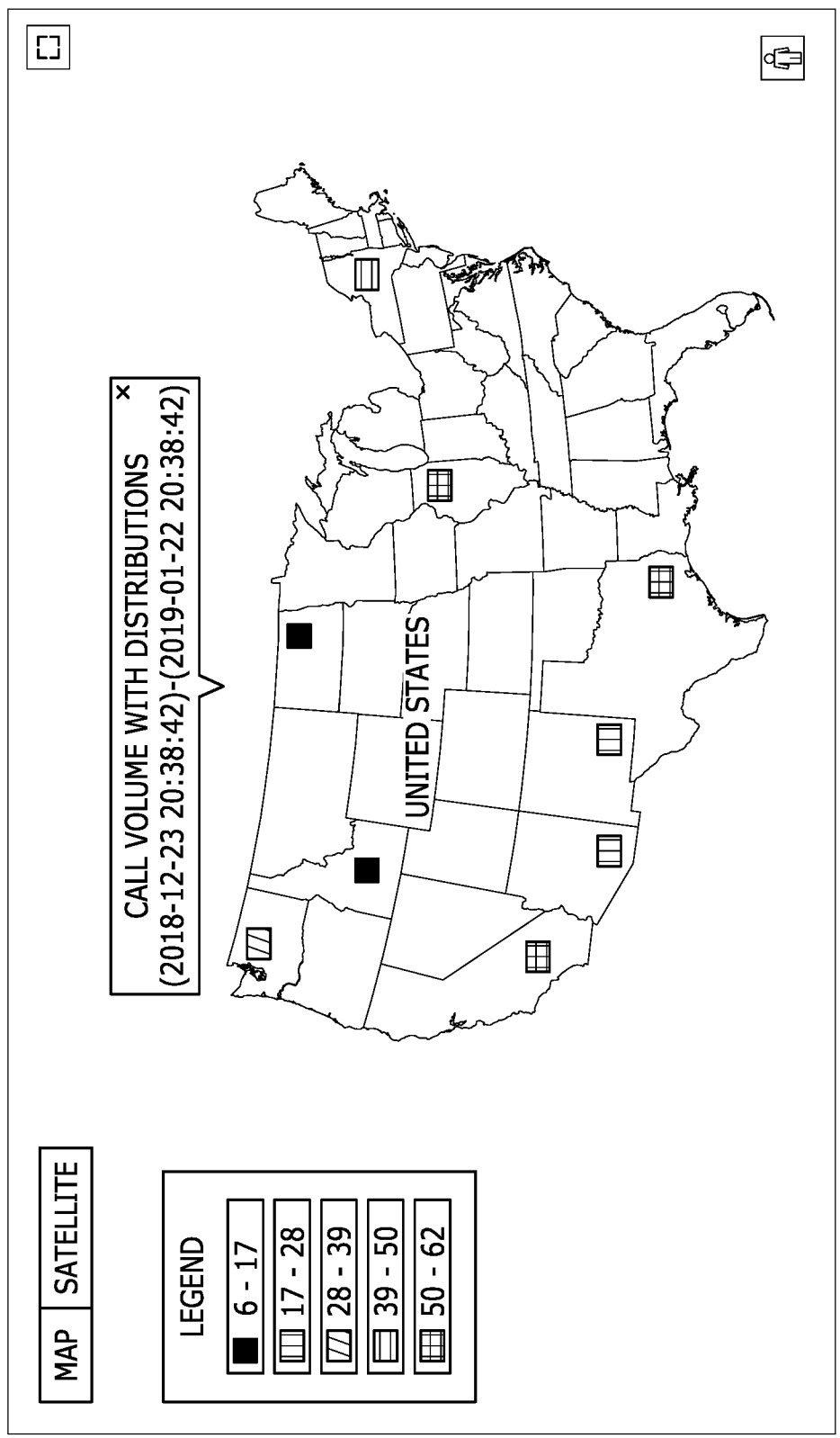
FIG. 12 is an example statistics report of call volume with distributions displayed on a map.

FIG. 11 is an example statistics report in a heat map format in which number of emergency calls is represented on a map using colored contoured sections that differentiate density of call volume within a given geographic area. FIG. 12 is an example statistics report of call volume with distributions displayed on a map of the United States which may be of interest to a national or regional emergency network 180. The report can be generated in near real-time such that resources may be allocated for large scale emergencies without the need to access the actual emergency data.

Figure 13:
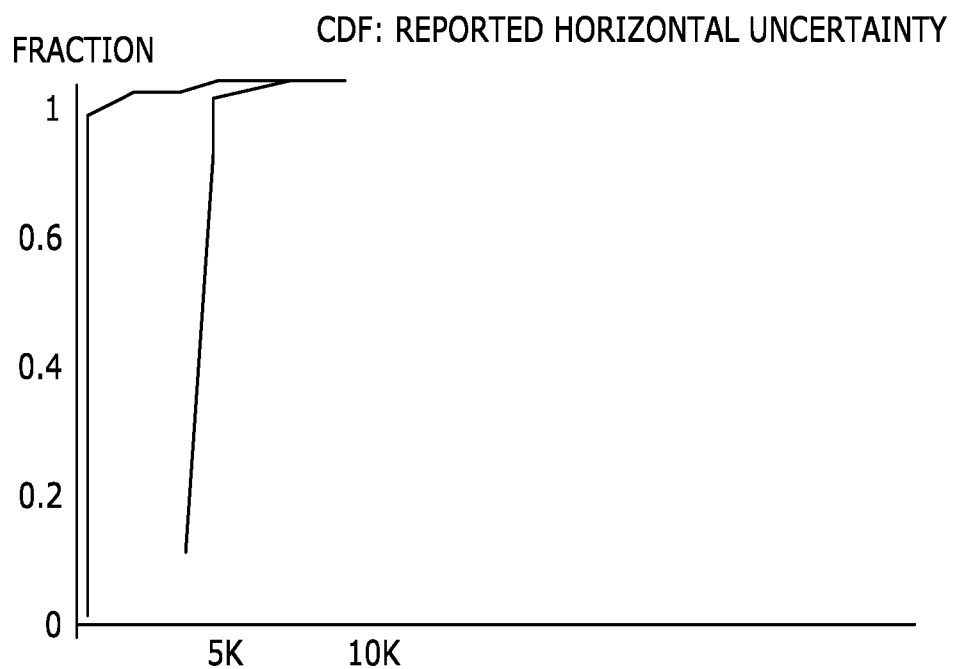
FIG. 13 is an example statistics report of horizontal uncertainty in location information.
Figure 14:
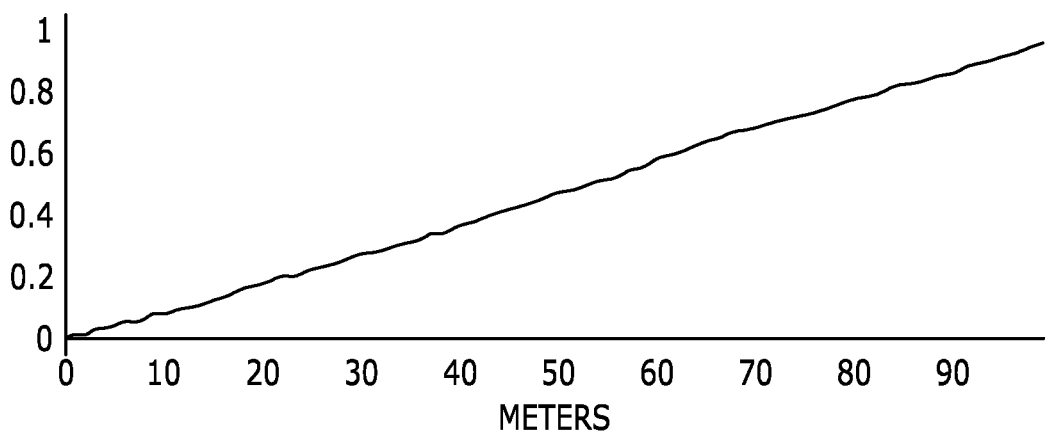
FIG. 14 is an example statistics report of uncertainty cumulative distribution function (CDF) per payload.

FIG. 13 is an example cumulative distribution function (CDF) of horizontal uncertainty in location information as a fraction, and FIG. 14 is an example chart of a horizontal uncertainty CDF per payload of emergency data. For example, this chart represents horizontal location uncertainty in meters versus percent of emergency calls received. Therefore, these charts provide insight into the system performance with respect to location accuracy.

Figure 15:
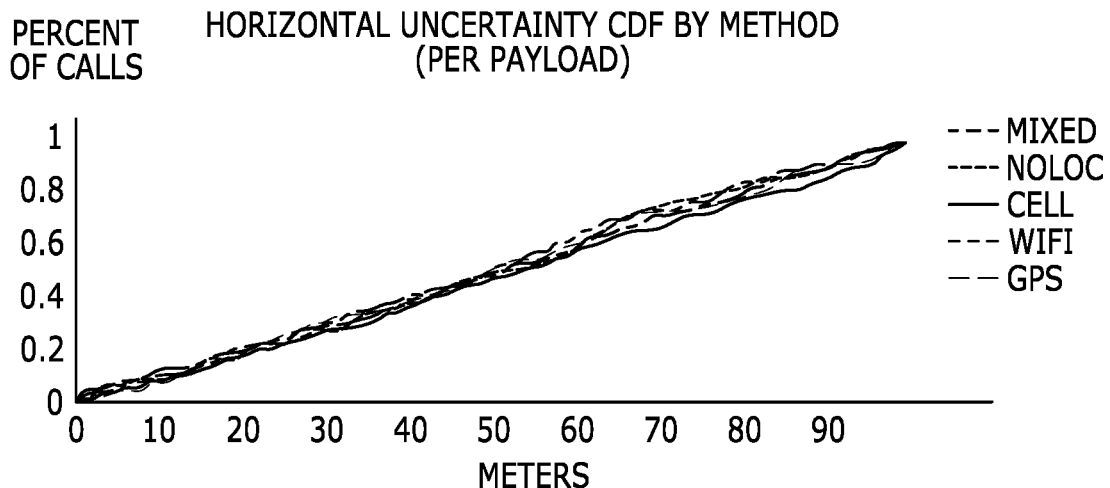
FIG. 15 is an example statistics report of uncertainty cumulative distribution function (CDF) by method per payload.

FIG. 15 is an example statistics report of a horizontal uncertainty CDF by method per payload including mixed methods, cellular, WiFi™, GPS and where no location is available.

Figure 16:
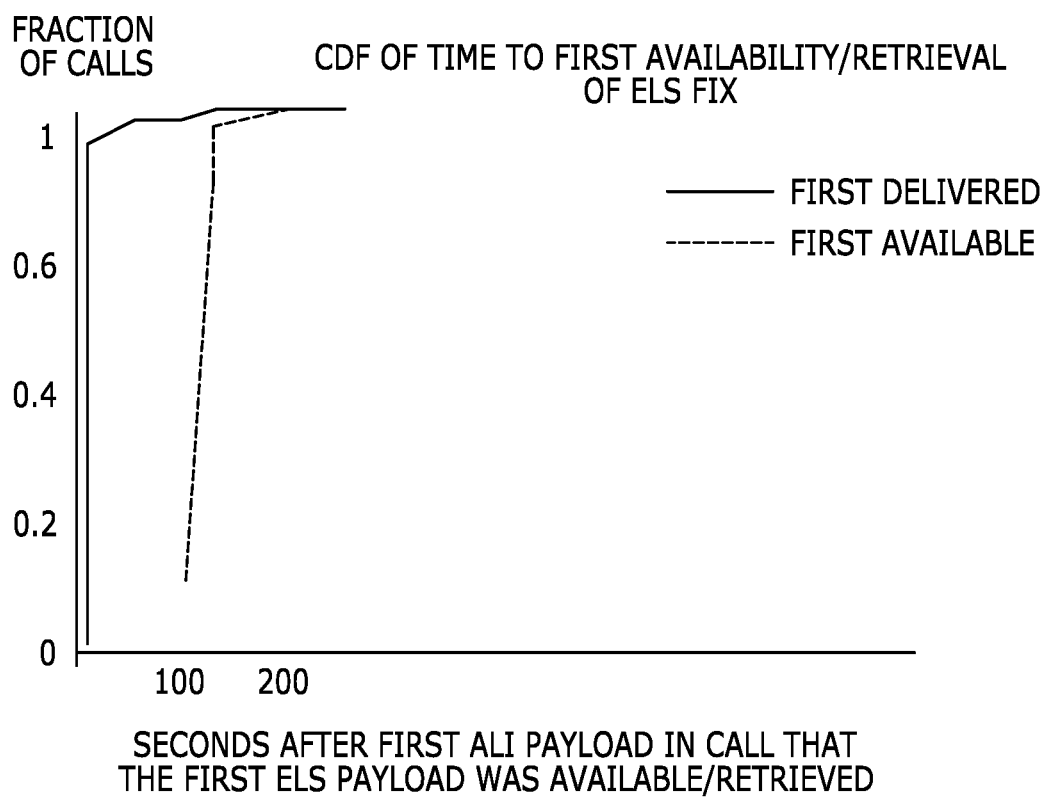
FIG. 16 is an example statistics report of time to first availability of an ELS location fix.

FIG. 16 is an example statistics CDF report of time to first availability of an ELS location fix in seconds between receiving an ALI payload and an ELS payload versus fraction of emergency call received.

Figure 17:
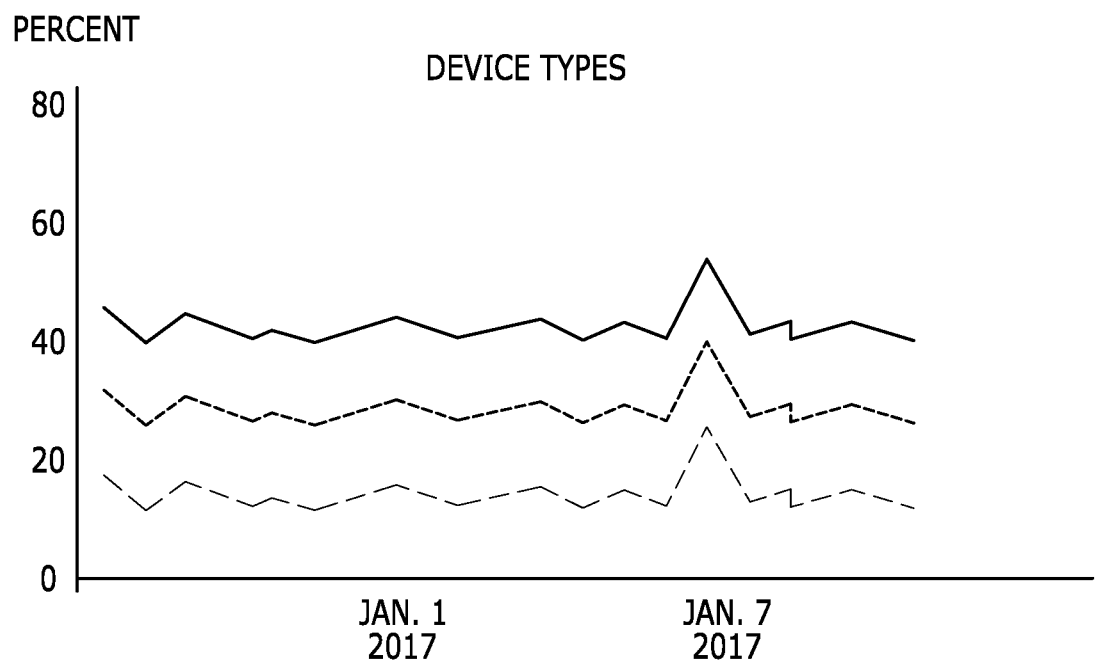
FIG. 17 is an example statistics report of percentage of device types establishing emergency sessions.

FIG. 17 is an example statistics report of percentage of device types establishing emergency sessions over a one-week period in percentage of device types.

Figure 18:
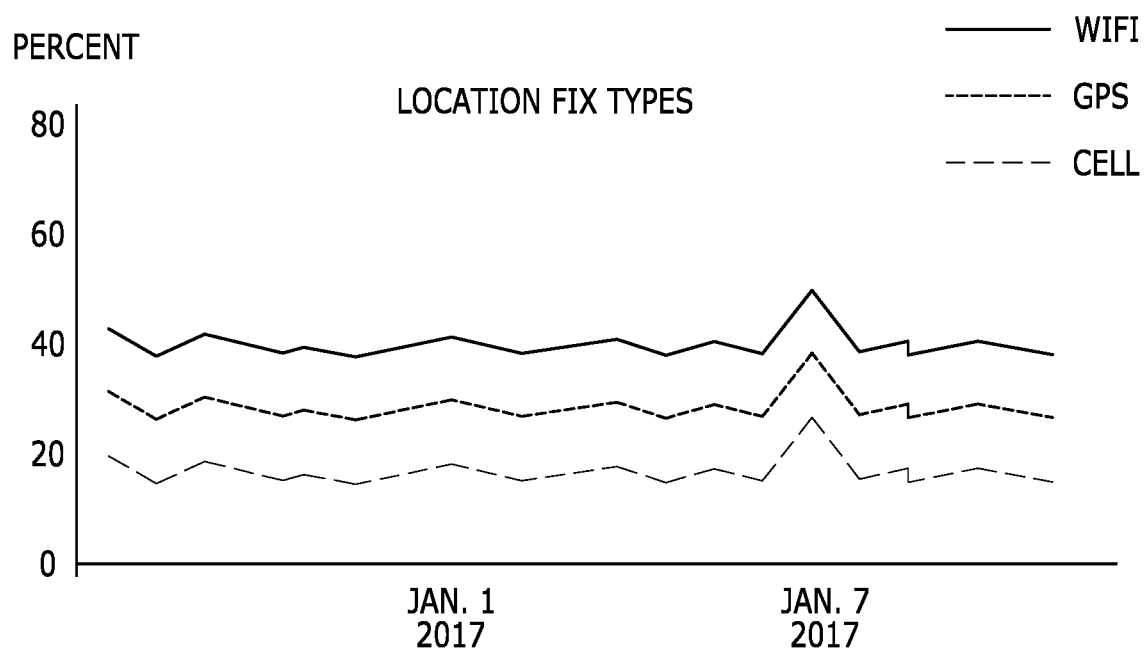
FIG. 18 is an example statistics report of percentage of location fix types.

FIG. 18 is an example statistics report of percentage of location fix types for three different location determination methods; cellular, WiFi™, and GPS.

Figure 19:
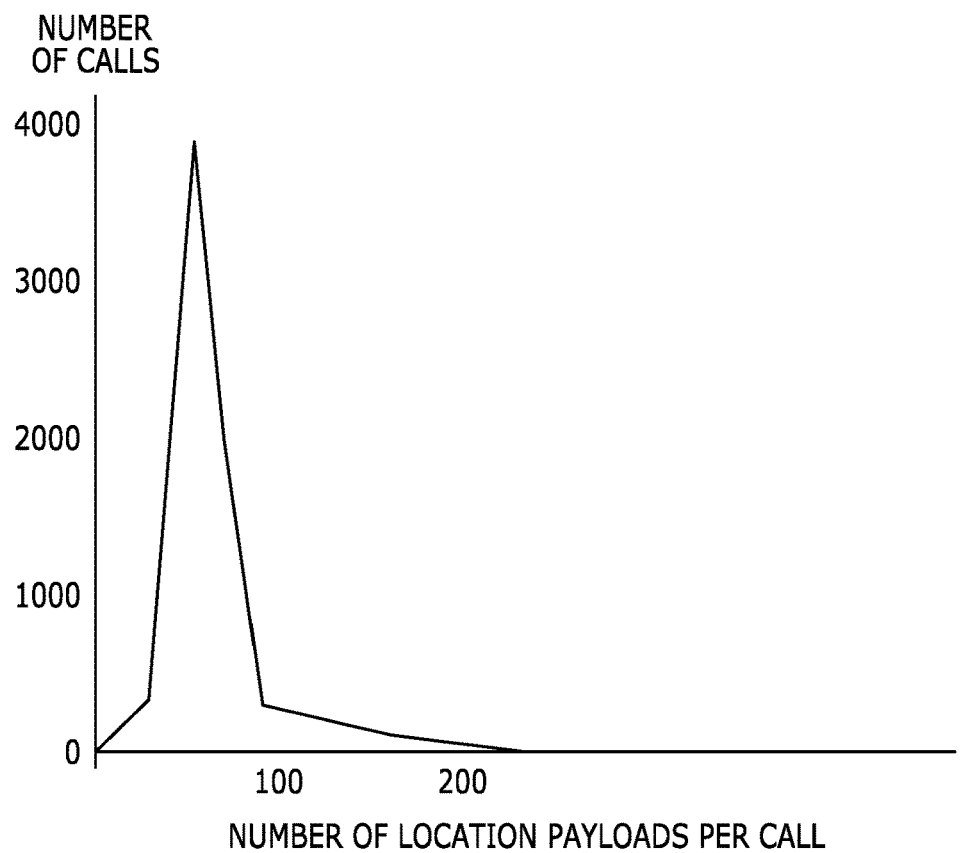
FIG. 19 is an example statistics report of a number of location payloads per emergency call.

FIG. 19 is an example statistics report of number of location payloads per emergency call.

Figure 20:
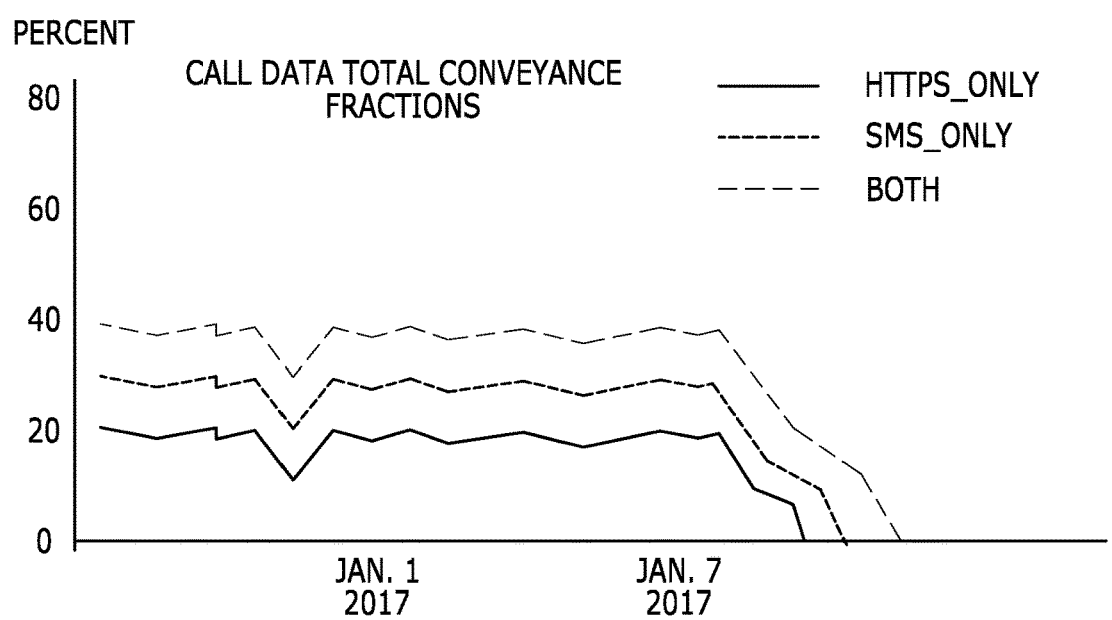
FIG. 20 is an example statistics report of call data total conveyance fractions.

FIG. 20 is an example statistics report of call data total conveyance fractions using two different methods of conveyance, HTTPS and SMS data.

The various example statistics reports can all be generated by the statistics module 276 after the emergency has occurred and without the need to access the emergency data. More particularly, the various example statistics reports can all be generated by the statistics module 276 without access any protected data such as PII whatsoever because of the data binning operations of the statistics module 276 which generates tallies without storing any of the source emergency data. The various example statistics reports can also be generated in real-time, or near-real time, so as to monitor system operations as well as system robustness and security. Specific data sources can be segregated by the statistics module 276, such as location data versus medical data, which further enhances security by limiting accessibility and potential data security breaches. Also, information from multiple emergency networks can be consolidated. For example, the various reports may be used for early detection of mass emergencies, or for identifying denial of service attacks, etc. across several hundred emergency networks. For example, denial-of-service attacks may be identified if unusually large volumes of data is observed flowing between given network entities. In another example, detecting a large number of payloads associated with a given event, such as a single emergency session, call or alert, could result from a device being used or hijacked as a "zombie" device.

Among other advantages, an emergency network such as a PSAP that may otherwise only have access to information within its own jurisdiction and may not be able to view emergencies in an adjacent jurisdiction, may be able to view statistics from other jurisdictions because only the bin tallies are needed without the need to access any emergency data.

Because emergency data payloads are purged, and transmission of emergency data is limited to a minimum number of buses by the statistics module 276 which may be implemented within the emergency data manager 100, the risk of privacy and security breaches of protected information is reduced.

Emergency data as used herein may include any type of "data." As used herein, "data" refers to a collection of information without limitation, including meta-data, about one or more entities such as a user of a device, the device itself, a sensor, a building, etc., and/or an environment that pertains to characteristics of the one or more entities. More particularly, data can refer to, among other things, health information; environment such as surrounding temperature, location, elevation, barometric pressure, ambient noise level, ambient light level, surrounding geography, etc.; pre-stored information in a device or in a database; personal information such as user identity, user name, height, weight, eye color, hair color, ethnicity, national origin, religion, languages spoken, vision correction or impairment, home address, work address, occupation, family information, user contact information, emergency contact information, social security number, alien registration number, driver's license number, vehicle VIN, organ donor status; sensor data from sensors such as, but not limited to, acoustic sensors, breathalyzers, carbon dioxide sensors, carbon monoxide sensors, infrared sensors, oxygen sensors, ozone monitors, pH sensors, smoke detectors, current sensors, voltage sensors, magnetometers, metal detectors, radio direction finders, air flow meters, anemometers, flow sensors, gas meters, water meters, Geiger counters, altimeters, air speed indicators, depth gauges, gyroscopes, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method for generating a statistical report using emergency data, without storing the emergency data used to generate the statistical report comprising:
   filtering, by a processor of a cloud-based system, incoming emergency data using at least one filtering criteria, as the emergency data is received at the cloud-based system in response to initiation of emergency events by mobile devices;
   generating, by the processor of the cloud-based system, at least one data bin representing a tally of emergency data meeting the at least one filtering criteria, without storing in a database at the cloud-based system any of the emergency data used to generate the at least one data bin to maintain privacy protection of the emergency data; and
   generating, by the processor of the cloud-based system, a statistical report using the at least one data bin.

2. The method of claim 1, wherein generating a statistical report comprises:
   generating a real-time statistical report using the at least one data bin.

3. The method of claim 1, further comprising:
   incrementing the tally in the at least one data bin upon detection of incoming emergency data meeting the at least one filtering criteria; and
   storing the at least one data bin without storing any of the incoming emergency data used to generate the at least one data bin.

4. The method of claim 1, wherein filtering, incoming emergency data using at least one filtering criteria, as the emergency data is received in response to initiation of emergency events, comprises:
   filtering the incoming emergency data using at least one filter selected from the group: time filter, field value filter, field text filter, geofence filter, mesh filter, and access credential filter.

5. The method of claim 1, wherein filtering, incoming emergency data using at least one filtering criteria, as the emergency data is received in response to initiation of emergency events, comprises:
   filtering based on the emergency event using at least one filter selected from the group: emergency calls, emergency alerts, and emergency data sessions.

6. The method of claim 1, further comprising:
   determining an emergency network to which to send incoming emergency data based on location associated with the emergency data and at least one geofence comprising the location.

7. The method of claim 1, further comprising:
   providing a map view to an emergency network entity, the map view comprising the statistical report using the tally in the at least one data bin.

8. The method of claim 7, wherein providing a map view to an emergency network entity, the map view comprising the statistical report using the tally in the at least one data bin, comprises:

providing a map view to an emergency network entity, the map view comprising a real-time emergency call volume distribution.

9. The method of claim 2, wherein generating a real-time statistical report using the at least one data bin, comprises: providing a statistical report view to an emergency network entity, the statistical report view comprising at least one real-time cumulative distribution function.

10. The method of claim 2, wherein generating a real-time statistical report using the at least one data bin, comprises: providing a statistical report view to an emergency network entity, the statistical report view comprising at least one view showing time of delivery of emergency location information to an emergency network entity, versus availability of the emergency location information.

11. The method of claim 2, wherein generating a real-time statistical report using the at least one data bin, comprises: providing a statistical report view to an emergency network entity, the statistical report view comprising at least one view showing a number of emergency location data payloads versus number of emergency calls.

12. The method of claim 2, wherein generating a real-time statistical report using the at least one data bin, comprises: providing a statistical report view to an emergency network entity, the statistical report view comprising at least one view showing location uncertainty for a plurality of location determination methods.

13. A cloud-based apparatus for generating a statistical report using emergency data, without storing the emergency data used to generate the statistical report comprising:
a network component, operative to connect to the Internet;
a processor, operatively coupled to the network component to provide a cloud-based system, the processor operative to:
filter incoming emergency data using at least one filtering criteria, as the emergency data is received at the cloud-based system in response to initiation of emergency events by mobile devices;
generate at least one data bin representing a tally of emergency data meeting the at least one filtering criteria, without storing any of the emergency data in a database of the cloud-based system, used to generate the at least one data bin; and
generate a statistical report using the at least one data bin.

14. The apparatus of claim 13, wherein the processor is further operative to:
generate a real-time statistical report using the at least one data bin.

15. The apparatus of claim 13, wherein the processor is further operative to:
increment the tally in the at least one data bin upon detection of incoming emergency data meeting the at least one filtering criteria; and
store the at least one data bin without storing any of the incoming emergency data used to generate the at least one data bin.

16. The apparatus of claim 13, wherein the processor is operative to filter incoming emergency data using at least one filtering criteria, as the emergency data is received in response to initiation of emergency events, by filtering the incoming emergency data using at least one filter selected from the group: time filter, field value filter, field text filter, geofence filter, mesh filter, and access credential filter.

17. The apparatus of claim 13, wherein the processor is further operative to filter incoming emergency data using at least one filtering criteria, as the emergency data is received in response to initiation of emergency events, by filtering based on emergency events using at least one filter selected from the group: emergency calls, emergency alerts, and emergency data sessions.

18. The apparatus of claim 13, wherein the processor is further operative to determine an emergency network to which to send incoming emergency data based on location associated with the emergency data and at least one geofence comprising the location.

19. The apparatus of claim 13, wherein the processor is further operative to:
provide a map view to an emergency network entity, the map view comprising the statistical report using the tally in the at least one data bin.

20. The apparatus of claim 19, wherein the processor is further operative to provide a map view to an emergency network entity, the map view comprising the statistical report using the tally in the at least one data bin, by providing a map view to an emergency network entity, the map view comprising a real-time emergency call volume distribution.

21. The apparatus of claim 13, wherein the processor is further operative to generate a real-time statistical report using the at least one data bin, by providing a statistical report view to an emergency network entity, the statistical report view comprising at least one real-time cumulative distribution function.

22. The apparatus of claim 13, wherein the processor is further operative to generate a real-time statistical report using the at least one data bin, by providing a statistical report view to an emergency network entity, the statistical report view comprising at least one view showing time of delivery of emergency location information to an emergency network entity, versus availability of the emergency location information.

23. The apparatus of claim 13, wherein the processor is further operative to generate a real-time statistical report using the at least one data bin, by providing a statistical report view to an emergency network entity, the statistical report view comprising at least one view showing a number of emergency location data payloads versus number of emergency calls.

24. The apparatus of claim 13, wherein the processor is further operative to generate a real-time statistical report using the at least one data bin, by providing a statistical report view to an emergency network entity, the statistical report view comprising at least one view showing location uncertainty for a plurality of location determination methods.

* * * * *